(12) United States Patent
Nachum et al.

(10) Patent No.: US 9,015,192 B1
(45) Date of Patent: Apr. 21, 2015

(54) SYSTEMS AND METHODS FOR IMPROVED PROCESSING OF PERSONALIZED MESSAGE QUERIES

(71) Applicant: Google Inc., Mountain View, CA (US)

(72) Inventors: David Nachum, San Francisco, CA (US); Daniel Weis, Livingston, NJ (US); Keith Coleman, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/219,988

(22) Filed: Mar. 19, 2014

Related U.S. Application Data

(60) Provisional application No. 61/922,009, filed on Dec. 30, 2013.

(51) Int. Cl.
*G06F 17/30* (2006.01)
(52) U.S. Cl.
CPC .... *G06F 17/30864* (2013.01); *G06F 17/30424* (2013.01)
(58) Field of Classification Search
CPC .................. G06F 17/30424; G06F 17/30554; G06F 17/30979; G06F 17/30991
USPC ....................................................... 707/769
See application file for complete search history.

(56) References Cited

U.S. PATENT DOCUMENTS

| | | | |
|---|---|---|---|
| 5,948,040 A * | 9/1999 | DeLorme et al. | ............. 701/426 |
| 6,044,260 A | 3/2000 | Eaton et al. | |
| 6,057,841 A | 5/2000 | Thurlow et al. | |
| 6,232,972 B1 | 5/2001 | Arcuri et al. | |
| 6,252,597 B1 | 6/2001 | Lokuge | |
| 6,333,973 B1 | 12/2001 | Smith et al. | |
| 6,351,764 B1 | 2/2002 | Voticky et al. | |
| 6,421,709 B1 | 7/2002 | McCormick et al. | |
| 6,507,866 B1 | 1/2003 | Barchi | |
| 6,700,591 B1 | 3/2004 | Sharpe | |
| 6,704,772 B1 | 3/2004 | Ahmed et al. | |
| 6,725,228 B1 | 4/2004 | Clark et al. | |
| 6,778,642 B1 | 8/2004 | Schmidt, Jr. et al. | |
| 7,120,865 B1 | 10/2006 | Horvitz et al. | |
| 7,167,910 B2 | 1/2007 | Farnham et al. | |
| 7,194,516 B2 | 3/2007 | Giacobbe et al. | |
| 7,359,947 B2 | 4/2008 | Kelley et al. | |
| 7,421,690 B2 | 9/2008 | Forstall et al. | |
| 7,429,993 B2 | 9/2008 | Hui | |
| 7,475,120 B1 | 1/2009 | Ngo et al. | |
| 7,536,652 B2 | 5/2009 | Uemura et al. | |
| 7,539,732 B2 | 5/2009 | Kelso et al. | |

(Continued)

*Primary Examiner* — Thu-Nguyet Le
(74) *Attorney, Agent, or Firm* — Morgan, Lewis & Bockius LLP

(57) ABSTRACT

Systems and methods for displaying electronic messages are disclosed. In some embodiments, a method includes, at a computing device, displaying an electronic message user interface and receiving a search query while displaying the electronic message user interface. The search query corresponds to a category identifier, of a plurality of predefined category identifiers. The method also includes, in response to receiving the search query, displaying one or more electronic messages, in a plurality of electronic messages, that satisfy the search query and concurrently displaying a set of data associated with an object identifier in a respective electronic message of the one or more electronic messages. The object identifier corresponds to the category identifier, and the set of data includes one or more entries defined in a data configuration associated with the category identifier.

19 Claims, 14 Drawing Sheets

(56) References Cited

U.S. PATENT DOCUMENTS

| | | |
|---|---|---|
| 7,730,137 B1 | 6/2010 | Toomey |
| 7,765,212 B2 | 7/2010 | Surendran et al. |
| 7,788,329 B2 | 8/2010 | Barrett et al. |
| 7,814,155 B2 | 10/2010 | Buchheit et al. |
| 7,895,279 B2 | 2/2011 | Forstall et al. |
| 7,895,537 B2 | 2/2011 | Gruen et al. |
| 7,958,099 B2 | 6/2011 | Kang et al. |
| 7,979,501 B1 | 7/2011 | Coleman et al. |
| 7,996,900 B2 | 8/2011 | Gillum et al. |
| 8,031,845 B2 | 10/2011 | Gruen et al. |
| 8,065,369 B2 | 11/2011 | Turski et al. |
| 8,108,469 B2 | 1/2012 | Kent, Jr. et al. |
| 8,140,703 B2 | 3/2012 | Morris et al. |
| 8,150,926 B2 | 4/2012 | Sundararajan et al. |
| 8,150,930 B2 | 4/2012 | Satterfield et al. |
| 8,176,130 B2 | 5/2012 | Daniell |
| 8,230,350 B2 | 7/2012 | Dodsworth |
| 8,233,885 B2 | 7/2012 | Kansal et al. |
| 8,239,874 B2 | 8/2012 | Anderson et al. |
| 8,281,382 B1 | 10/2012 | Sanyal et al. |
| 8,307,029 B2 | 11/2012 | Davis et al. |
| 8,375,307 B2 | 2/2013 | Kim |
| 8,402,096 B2 | 3/2013 | Affronti et al. |
| 8,448,084 B2 | 5/2013 | Brichter |
| 8,499,048 B2 | 7/2013 | Malik et al. |
| 8,560,619 B1 | 10/2013 | Huston et al. |
| 8,572,277 B2 | 10/2013 | Morris et al. |
| 8,583,747 B2 | 11/2013 | Buchheit et al. |
| 8,626,851 B2 | 1/2014 | Buchheit et al. |
| 8,656,289 B1 | 2/2014 | Dodsworth |
| 2002/0160757 A1 | 10/2002 | Shavit et al. |
| 2003/0020749 A1 | 1/2003 | Abu-Hakima et al. |
| 2003/0154212 A1 | 8/2003 | Schirmer et al. |
| 2003/0195811 A1 | 10/2003 | Hayes, Jr. et al. |
| 2003/0214534 A1 | 11/2003 | Uemura et al. |
| 2003/0233419 A1 | 12/2003 | Beringer |
| 2004/0254998 A1 | 12/2004 | Horvitz |
| 2005/0018819 A1 | 1/2005 | Schmidt, Jr. et al. |
| 2005/0080851 A1 | 4/2005 | Kent, Jr. et al. |
| 2005/0080862 A1 | 4/2005 | Kent, Jr. et al. |
| 2005/0102366 A1 | 5/2005 | Kirsch |
| 2005/0114781 A1 | 5/2005 | Brownholtz et al. |
| 2005/0246658 A1 | 11/2005 | Uemura et al. |
| 2006/0031340 A1 | 2/2006 | Mathew et al. |
| 2006/0031347 A1 | 2/2006 | Sahi |
| 2006/0064410 A1* | 3/2006 | Razza et al. .............. 707/3 |
| 2006/0075044 A1 | 4/2006 | Fox et al. |
| 2006/0095466 A1 | 5/2006 | Stevens et al. |
| 2006/0173824 A1 | 8/2006 | Bensky et al. |
| 2006/0206495 A1 | 9/2006 | Van Gageldonk et al. |
| 2007/0005592 A1 | 1/2007 | Kender et al. |
| 2007/0262861 A1 | 11/2007 | Anderson et al. |
| 2007/0277113 A1 | 11/2007 | Agrawal et al. |
| 2007/0299923 A1 | 12/2007 | Skelly et al. |
| 2010/0030798 A1 | 2/2010 | Kumar et al. |
| 2010/0049806 A1 | 2/2010 | Haynes et al. |
| 2010/0114855 A1 | 5/2010 | Li et al. |
| 2010/0199180 A1 | 8/2010 | Brichter |
| 2010/0262922 A1 | 10/2010 | Fan et al. |
| 2010/0278453 A1 | 11/2010 | King |
| 2011/0010182 A1 | 1/2011 | Turski et al. |
| 2011/0072363 A1 | 3/2011 | Mandel et al. |
| 2011/0231499 A1 | 9/2011 | Stovicek et al. |
| 2012/0102037 A1 | 4/2012 | Ozonat |
| 2012/0131095 A1 | 5/2012 | Luna et al. |
| 2012/0198053 A1 | 8/2012 | Ozhan et al. |
| 2012/0271908 A1 | 10/2012 | Luna et al. |
| 2012/0272160 A1 | 10/2012 | Spivack et al. |
| 2013/0024440 A1 | 1/2013 | Dimassimo et al. |
| 2013/0055099 A1 | 2/2013 | Yao et al. |
| 2013/0055105 A1 | 2/2013 | Spierer |
| 2013/0159879 A1 | 6/2013 | Affronti et al. |
| 2013/0165165 A1 | 6/2013 | Macek et al. |
| 2013/0166280 A1 | 6/2013 | Quast et al. |
| 2013/0212189 A1 | 8/2013 | Velissarakos |
| 2013/0297604 A1 | 11/2013 | Sutedja et al. |
| 2013/0305187 A1 | 11/2013 | Phillips et al. |
| 2013/0325705 A1 | 12/2013 | Laird et al. |
| 2014/0052797 A1 | 2/2014 | Lessard et al. |
| 2014/0096032 A1 | 4/2014 | Mayblum et al. |
| 2014/0115495 A1 | 4/2014 | Wetherell et al. |

* cited by examiner

SYSTEMS AND METHODS FOR IMPROVED PROCESSING OF PERSONALIZED MESSAGE QUERIES

CROSS REFERENCE TO RELATED APPLICATION

This application claims priority to U.S. Provisional Patent Application No. 61/922,009, entitled "Systems and Methods for Improved Processing of Personalized Message Queries," filed Dec. 30, 2013, which is hereby incorporated by reference herein in its entirety.

TECHNICAL FIELD

The embodiments disclosed herein relate generally to displaying electronic messages in a messaging application.

BACKGROUND

A typical user of a messaging application often has a large number of electronic messages, such as emails, in the user's electronic message account. Such a large number of electronic messages can be cumbersome to navigate through. Messaging application users wish to navigate through a listing of such electronic messages quickly to identify relevant messages. However, the typical volume of electronic messages makes it difficult to do so.

The above identified technical problems are reduced or eliminated by the systems and methods disclosed herein.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

SUMMARY

Figure 1:
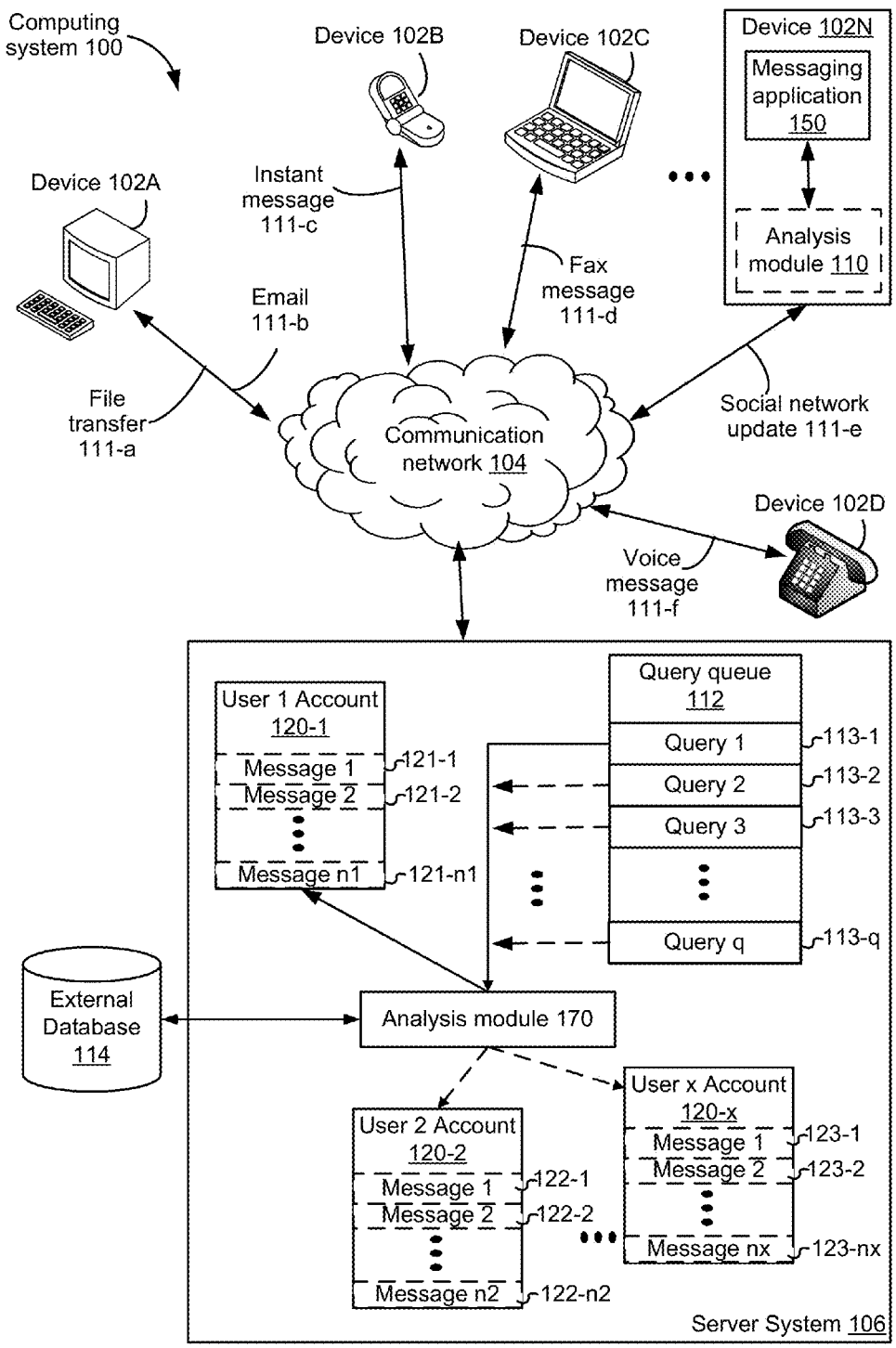
FIG. 1 is an example block diagram illustrating a computing system, in accordance with some embodiments.

Technical solutions (e.g., computing systems, methods, and non-transitory computer readable storage mediums) for processing search queries for electronic messages are provided in the present application.

In some embodiments, a method for displaying electronic messages includes, at a computing device, displaying an electronic message user interface and, while displaying the electronic message user interface, receiving a search query for one or more electronic messages. The search query corresponds to a category identifier, of a plurality of predefined category identifiers. The method also includes, in response to receiving the search query, displaying one or more electronic messages, in a plurality of electronic messages, that satisfy the search query; and concurrently displaying, with the one or more electronic messages, a set of data, associated with an object identifier in a respective electronic message of the one or more electronic messages. The object identifier corresponds to the category identifier, and the set of data includes one or more entries defined in a data configuration associated with the category identifier.

In some embodiments, the method includes visually distinguishing a subset of the one or more electronic messages from a remainder of the one or more electronic messages. Each electronic message in the subset of the one or more electronic messages has a corresponding set of data, and the corresponding set of data includes one or more entries defined in the data configuration associated with the category identifier.

In some embodiments, the method includes displaying a subset of the one or more electronic messages. Each electronic message in the subset of the one or more electronic messages has a corresponding set of data, and the corresponding set of data includes one or more entries defined in the data configuration associated with the category identifier. Electronic messages in the subset of the one or more electronic messages are collocated in the electronic message user interface.

In some embodiments, the method includes displaying a portion of a first electronic message in a subset of the one or more electronic messages, while foregoing displaying one or more messages, in the subset of the one or more electronic messages, other than the first electronic message. Each electronic message in the subset of the one or more electronic messages has a corresponding set of data, and the corresponding set of data includes one or more entries defined in the data configuration associated with the category identifier.

In some embodiments, the plurality of predefined category identifiers includes two or more of: hotels, restaurants, trains, buses, car rentals, purchase records, and shipment notifications.

In some embodiments, the category identifier corresponds to travel information, and the set of data includes one or more of: travel dates, flight status, flight arrival time, hotel reservation, hotel information, and car rental information.

In some embodiments, the category identifier is contacts, and the set of data includes a name and one or more of: a phone number, a physical address, and an email address, and one or more entries in the set of data include information in the respective electronic message.

In some embodiments, one or more entries in the set of data include information, stored at the computing device, distinct from information in the respective electronic message.

In some embodiments, the category identifier corresponds to an event, and the corresponding set of data includes event information.

In some embodiments, the method includes updating the display of the set of data independent of a user input and repeating the updating of the display of the set of data independent of user inputs.

In some embodiments, the object identifier in the respective electronic message is identified in accordance with an augmentation rule. In some embodiments, the augmentation rule makes use of a predetermined phone number format, a predetermined email format, a predetermined address format, a predetermined country code format, and/or a predetermined geographical location format.

In some embodiments, a method includes, at a server system, providing information for displaying an electronic message user interface; and, subsequent to providing the information for displaying the electronic message user interface, receiving a search query for an electronic message. The method also includes, in response to receiving the search query, identifying a category identifier, of a plurality of predefined category identifiers, corresponding to the search query and identifying one or more electronic messages, in a plurality of electronic messages, satisfying the search query. The method further includes, for a respective electronic message of the one or more identified electronic messages, identifying an object identifier, in the respective electronic message, that corresponds to the category identifier; obtaining a set of data, associated with the object identifier, the set of data including one or more entries defined in a data configuration that corresponds to the category identifier; and providing the set of data, associated with the object identifier of the one or more object identifiers, for concurrent display with the respective electronic messages.

In some embodiments, the plurality of predefined category identifiers includes two or more of: hotels, restaurants, trains, buses, car rentals, purchase records, and shipment notifications.

In some embodiments, the category identifier is contacts, and the set of data includes a name and one or more of: a phone number, a physical address, and an email address. One or more entries in the set of data include information in the respective electronic message, and one or more entries in the set of data include information distinct from information in the respective electronic message.

In other aspects of the present disclosure, computing systems and non-transitory computer storage mediums for executing one or more steps of any of the above-described methods are also disclosed.

DETAILED DESCRIPTION

As explained above, a typical user of a messaging application often has a large number of electronic messages, such as emails, in the user's electronic message account. Such a large number of electronic messages can be cumbersome to navigate through. In particular, when a user needs to find relevant information, the user often needs to perform a search to find electronic messages that contain relevant information. However, electronic messages identified with traditional methods do not include information updated subsequent to the transmission of such electronic messages (e.g., current traffic information), and the user often needs to perform additional searches to find information that the user needs.

For example, when a user wants to know an estimated departure time of the user's flight, in some cases, traditional methods require the user to search for an email that includes information identifying the user's flight (e.g., a flight number). Thereafter, the user needs to search separately for the departure time (e.g., from the airline's webpage) using the flight number in order to find out the estimated departure time of the user's flight. This is cumbersome and inefficient.

The embodiments described herein provide various technical solutions to improving access to information in electronic messages, and in particular to the above-identified problems, by providing techniques for displaying electronic messages to a user. Instead of presenting static information in electronic messages, information, related to content of the identified electronic messages (e.g., the estimated departure time), that is not included in the electronic messages is obtained and presented with information included in the identified electronic messages (e.g., the flight number). Thus, this eliminates the need for the user to perform a separate search for the information not included in the electronic message, thereby improving efficiency in obtaining relevant information using electronic messages.

Details of embodiments are now described in relation to the Figures.

FIG. 1 is a block diagram illustrating a computing system 100, in accordance with some embodiments.

In some embodiments, the computing system 100 includes one or more devices 102 (e.g., device 102A, 102B, 102C, 102D . . . , and 102N), a communication network 104, and a server system 106. In some embodiments, a device 102 is a phone (mobile or landline, smart phone or otherwise), a tablet, a computer (mobile or otherwise), a fax machine, or an audio/video recorder.

In some embodiments, a device 102 obtains an electronic message from (e.g., drafted or generated by) a user of the device 102, and transmits the electronic message to the server system 106 for display with other electronic messages. For example, after determining that user Jack sends an electronic message to user Mary, the device 102 transmits the electronic message to the server system 106, which processes the electronic message into a user interface object for display in a list of electronic messages.

In some embodiments, an electronic message is a file transfer 111-*a* (e.g., a photo, document, or video download/upload), an email 111-*b*, an instant message 111-*c* (e.g., a GOOGLE HANGOUT message), a fax message 111-*d*, a social network update 111-*e* (e.g., a GOOGLE PLUS update), or a voice message 111-*f*. In some embodiments, an electronic message is contact information, an indication of a document, a calendar entry, an email label, a recent search query, a suggested search query, or a web search result.

In some embodiments, a device 102 includes a messaging application 150 and optionally an analysis module 110. In some embodiments, the messaging application 150 processes incoming and outgoing electronic messages into and from the device 102, such as an outgoing email sent by a user of the device 102 to another user, and a chat message by another user to a user of the device 102. In some embodiments the messaging application 150 is an e-mail application. In some embodiments, the analysis module 110 resident on the device 102 balances processing load with the analysis module 170 resident on the server system 106. For example, after a user requests to send out a total of six emails, the analysis module 110 on the device 102 processes the first three emails (which, in some embodiments, include plain text emails, e.g., without HTML content or attachments, and thus might require less processing power), and the analysis module 170 on the server system 106 processes the remaining three emails (which, in some embodiments, include HTML content or attachments, and thus might require more processing power). In some embodiments, the analysis module 170 on the server system 106 obtains information from an external database 114, and the analysis module 110 resident on the device 102 obtains information stored at the device 102.

In some embodiments, the communication network 104 interconnects one or more devices 102 with each other, and with the server system 106. In some embodiments, the communication network 104 optionally includes the Internet, one or more local area networks (LANs), one or more wide area networks (WANs), other types of networks, or a combination of such networks.

Figure 3:
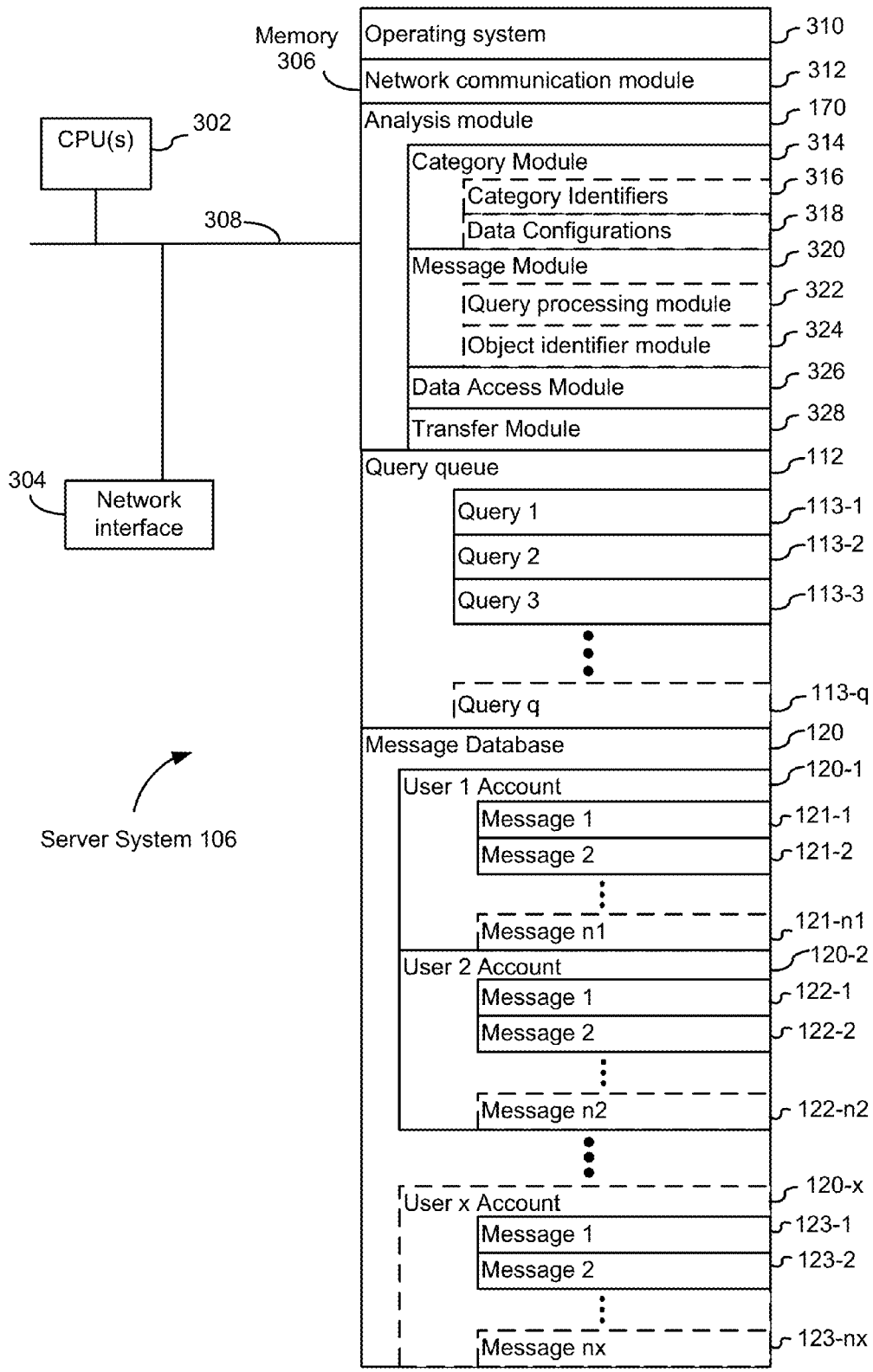
FIG. 3 is an example block diagram illustrating a server system, in accordance with some embodiments.

With reference to FIGS. 1 and 3, in some embodiments, the server system 106 includes an analysis module 170, a query queue 112 and electronic message accounts for a plurality of users (e.g., user 1 account 120-1, user 2 account 120-2, user x account 120-*x*, etc.).

In some embodiments, the query queue 112 stores a plurality of queries (e.g., query 1 (113-1), query 2 (113-2), query 3 (113-3), query q (113-q), etc.) from a plurality of users. In some embodiments, a respective query includes one or more keywords (e.g., "my flights," "restaurant reservations," etc.) provided by a respective user. The respective query is used to identify one or more electronic messages that satisfy the respective query.

In some embodiments, the server system 106 analyzes content of electronic messages (e.g., messages 121, 122, and 123, etc.), and identifies electronic messages that satisfy a query from a user. For example, when a first user (e.g., user 1) provides a query "my flights," the analysis module 170 identifies, if any, one or more electronic messages, of the electronic messages of the first user (e.g., a message 1 (121-1), a message 2 (121-2), a message n1 (121-n1), etc. in the user 1 account 120-1), that satisfy the query. In another example, when a second user (e.g., user 2) provides a query "restaurant reservations," the analysis module 170 identifies, if any, one or more electronic messages, of the electronic messages of the second user (e.g., a message 1 (122-1), a message 2 (122-2), a message n2 (122-n2), etc. in the user 2 account 120-2), that satisfy the query.

In some embodiments, the analysis module 110 is a software or hardware component resident on the device 102, such as a software package/application or a hardware chipset, for processing electronic messages stored in the device 102, and the analysis module 170 on the server system 106 is not used. In some embodiments, the analysis module 110 is not present and the analysis module 170, which exists separate from or independent of the device 102 is used (e.g., a GOOGLE mail processing server that is connected with but not part of the device 102, e.g., in the manner depicted in FIG. 1 with the analysis module 170). In still other embodiments, the analysis module 110 is a software or hardware component resident on the device 102, such as a software package/application or a hardware chipset, for displaying electronic messages, and the analysis module 170 on the server system 106 is also used. That is, both the analysis module 110 on the device 102 and the analysis module 170 on the server system 106 are used. For instance, in some such embodiments, one or more electronic messages stored in the device 102 are processed by the analysis module 110 and electronic messages not stored in the device 102 are processed by the analysis module 170. In some embodiments, the one or more electronic messages stored in the device 102 are provided by the server system 106 for processing by the analysis module 110. In some embodiments, such distribution of electronic messages to devices 102 occurs on a recurring basis (e.g., periodic or nonperiodic basis).

In some embodiments, a user account (also called herein an electronic message account of a user) 120 stores one or more electronic messages sent to the user, such as message 1 (121-1), message 2 (121-2), and message n1 (121-n1) in user 1 account 120-1, message 1 (122-1), message 2 (122-2), and message n2 (122-n2) in user 2 account 120-2, and message 1 (123-1), message 2 (123-2), and message nx (123-nx) in user x account 120-x. In some embodiments, the user account 120 includes different types of electronic messages, such as a file transfer 111-a (e.g., a photo, document, or video upload), an email 111-b, an instant message 111-c (e.g., a Google HANGOUT message), a fax message 111-d, a social network update 111-e (e.g., a GOOGLE PLUS update), a voice message 111-f, contact information, an indication of a document, a calendar entry, an email label, a recent search query, a suggested search query, or a web search result. In some embodiments, the user account 120 includes electronic messages only.

In some embodiments, the external database 114 includes one or more databases or data servers distinct from the server system 106. In some embodiments, the external database 114 includes one or more of: a map database, a traffic information database, a flight status database, and a restaurant reservation database.

Figure 2:
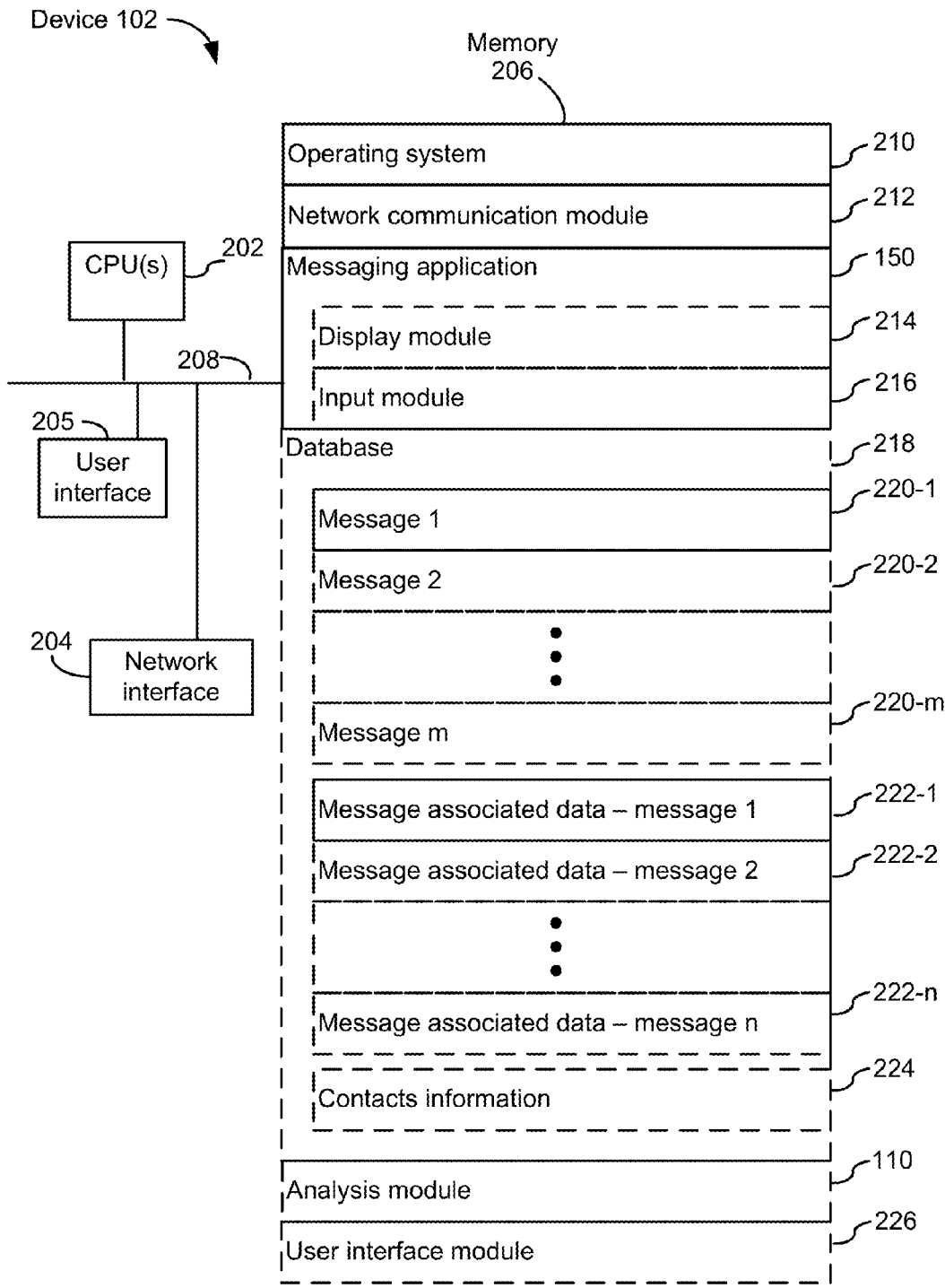
FIG. 2 is an example block diagram illustrating a computing device, in accordance with some embodiments.

FIG. 2 is a block diagram illustrating a computing device 102, in accordance with some embodiments. The device 102, in some embodiments, includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. In some embodiments, the user interface 205 includes an input device (e.g., a keyboard, a mouse, a touchpad, a track pad, and a touch screen) for a user to interact with the device 102.

The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some embodiments, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the device 102 with other devices (e.g., the server system 106 and the devices 102B through 102N) via one or more network interfaces 204 (wired or wireless), or the communication network 104 (FIG. 1);
- a messaging application 150 for processing and displaying incoming and outgoing electronic messages;
- optionally a database 218 for storing one or more messages (e.g., messages 220-1, 220-2, and 220-m), message associated data (e.g., data 222-1, 222-2, and 222-n), and contact information 224;
- optionally an analysis module 110 for analyzing content of (e.g., income and outgoing) electronic messages; and
- optionally a user interface module 226 for displaying user interface components or controls (e.g., textbox, button, radio button, drop-down list) to a user.

In some embodiments, the messaging application 150 includes one or more of:

- a display module 214 for displaying and modifying user interface objects for one or more electronic messages; and
- an input module 216 for receiving a user input (e.g., using the user interface 205), such as selection of one or more user interface objects and a search query.

In some embodiments, the display module 214 includes one or more sub-modules, such as (i) an electronic message display sub-module that initiates display of at least a portion of an electronic message, and (ii) a data set display submodule that initiates display of a set of data associated with the electronic message.

In some embodiments, the database 218 includes one or more of:

- electronic messages, such as a first electronic message 220-1, a second electronic message 220-2, and an $m^{th}$ electronic message 220-m that were sent to a user of the device 102;
- message associated data, such as data associated with the first electronic message 222-1, data associated with the second electronic message 222-2, and data associated with the $n^{th}$ electronic message 222-n, where n (the number of electronic messages that have associated data) is typically equal to or less than m (the number of electronic messages stored in the device 102); and
- contact information 224 that include information (e.g., name, phone number, email address, home address, and/or work address) of the user's contacts.

In some embodiments, one or more electronic messages stored in the database 218 do not have associated data.

In some embodiments, one or more of the above-identified elements are stored in one or more of the previously referenced memory devices, and correspond to a set of instructions for performing a function described above. The above-identified modules or programs (e.g., sets of instructions) need not be implemented as separate software programs, procedures or modules, and thus various subsets of these modules may be combined or otherwise re-arranged in various embodiments. In some embodiments, the memory 206 stores a subset of the modules and data structures identified above. Furthermore, the memory 206 may store additional modules and data structures not described above.

FIG. 3 is a block diagram illustrating a server system 106, in accordance with some embodiments. The server system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some embodiments, the memory 306 or alternatively the non-transitory computer readable storage medium stores the following programs, modules and data structures, or a subset thereof:

- an operating system 310, which includes procedures for handling various basic system services and for performing hardware dependent tasks;
- a network communication module (or instructions) 312 for connecting the server system 106 with other devices (e.g., the devices 102) via the one or more network interfaces 304 (wired or wireless), or the communication network 104 (FIG. 1);
- an analysis module 170 for conducting a content-based analysis on (e.g., incoming and outgoing) electronic messages and identifying electronic messages that satisfy search queries;
- a query queue 112 for storing queries awaiting processing by the analysis module 170, e.g., query 1, query 2, query 3, . . . and query q (113-1, 113-2, 113-3, . . . and 113-*q*); and
- a message database 120, which include a plurality of user accounts, such as:
  - a first user account 120-1 that includes one or more electronic messages (e.g., a first electronic message 121-1, a second electronic message 121-2, an $n1^{th}$ electronic message, etc.) for a first user;
  - a second user account 120-2 that includes one or more electronic messages (e.g., a first electronic message 122-1, a second electronic message 122-2, an $n2^{th}$ electronic message, etc.) for a second user; and
  - an $x^{th}$ user account 120-*x* that includes one or more electronic messages (e.g., a first electronic message 123-1, a second electronic message 123-2, an $nx^{th}$ electronic message, etc.) for an $x^{th}$ user.

In some embodiments, the analysis module 170 includes one or more of:

- a category module 314 configured for identifying a category identifier that corresponds to a search query;
- a message module 320 configured for processing electronic messages;
- a data access module 326 configured for obtaining data that is associated with an object identifier and corresponds to a category identifier; and
- a transfer module 328 configured for providing, to a computing device, data that is associated with an object identifier and corresponds to a category identifier.

In some embodiments, the category module 314 includes a plurality of predefined category identifiers 316. For example, in some embodiments, the plurality of predefined category identifiers includes hotels, restaurants, trains, buses, flights, car rentals, purchase records, and shipment notifications. In some embodiments, the plurality of predefined category identifiers 316 also has, for each predefined category identifier, one or more associated keywords. In some embodiments, the one or more associated keywords are used to identify a category identifier that corresponds to a search query. For example, in some embodiments, a predefined category identifier "restaurants" is associated with keywords "food" and "reservation." In some embodiments, in accordance with a determination that a search query includes a keyword "reservation," the server system determines that the search query corresponds to the "restaurants" category identifier.

In some embodiments, the category module 314 includes a plurality of data configurations 318 that correspond to the plurality of category identifiers. A data configuration defines one or more data entries to be displayed concurrently with a corresponding electronic message. For example, in some embodiments, a category identifier "restaurants" has a data configuration that defines a map and directions as information to be provided for concurrent display with a corresponding electronic message. In another example, in some embodiments, a category identifier "flights" has a data configuration that defines one or more of: a flight status, an estimated departure time, and an estimated arrival time as information to be provided for concurrent display with a corresponding electronic message. In some embodiments, each category identifier has a corresponding data configuration. In some embodiments, each category identifier has more than one corresponding data configuration.

In some embodiments, the message module 320 includes a query processing module 322 configured for identifying one or more electronic messages that satisfy a search query. In some embodiments, an electronic message is deemed to satisfy a search query when the electronic message includes all of the keywords in the search query. In some other embodiments, an electronic message is deemed to satisfy a search query when the electronic message includes any of the keywords in the search query. In some embodiments, the query processing module 322 is also configured for receiving a search query for an electronic message from a computing device (e.g., the device 102, FIG. 2).

In some embodiments, the message module 320 includes an object identifier module 324 configured for identifying an object identifier in an electronic message that corresponds to a category identifier. For example, in some embodiments, for the category identifier "restaurants," the server system 106 identifies a name of a restaurant in an electronic message as an object identifier. In another example, in some embodiments, for the category identifier "flights," the server system 106 identifies a flight number in an electronic message as an object identifier.

In some embodiments, the message module 320 determines the category identifier based on the search query. For example, if the search query includes the term "flights", category identifier will be deemed to be "flights." In some embodiments, more than one category identifier is derivable from a single search query in this manner. This is addressed in various embodiments. For instance, in some embodiments, the plurality of possible category identifiers has an associated hierarchical nature, such that a category identifier higher up in the hierarchy takes precedence over a lower category identifier when both are present in the hierarchy. In alternative embodiments, multiple category identifiers for a single search expression are permitted and sets of data for each of the multiple category identifiers are displayed with one or more of the electronic messages that satisfy the search query. In still other embodiments, the ultimate category identifier selected for a search query is dependent upon which such category identifier has the most number of matching object identifiers in the one or more electronic messages that satisfy the search query. In still other embodiments, in addition to a search query, a user explicitly and independently specifies one or more category identifiers for the search query.

In some embodiments, the data access module 326 is configured for obtaining, from an external database 114, data that is associated with an object identifier and corresponds to a category identifier. For example, in some embodiments, the data access module 326 obtains data that is associated with a flight number and corresponds to a category identifier "flights" (e.g., estimated departure time and estimated arrival time) from an external flight information database (e.g., an airline database or an airport database). In another example, in some embodiments, the data access module 326 obtains data that is associated with a restaurant name and corresponds to a category identifier "restaurants" (e.g., directions and traffic conditions) from a map information database or a map information server.

In some embodiments, the transfer module 328 is also configured for providing information for displaying an electronic message user interface (e.g., a user interface 400 described below with respect to FIGS. 4A-4H).

In some embodiments, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, the memory 306 optionally stores a subset of the modules and data structures identified above. Furthermore, the memory 306 may store additional modules and data structures not described above.

Although FIGS. 2 and 3 show a "device 102" and a "server system 106," respectively, FIGS. 2 and 3 are intended more as functional description of the various features which may be present in computer systems than as a structural schematic of the embodiments described herein. In practice, and as recognized by those of ordinary skill in the art, items shown separately could be combined and some items could be separated.

FIGS. 4A-4H illustrate example user interfaces 400 of a messaging application 150 for displaying electronic messages in accordance with some embodiments. In some embodiments, the example user interfaces 400 illustrated in FIGS. 4A-4H are displayed by a computing device (e.g., computing device 102, FIG. 2).

Figure 4A:
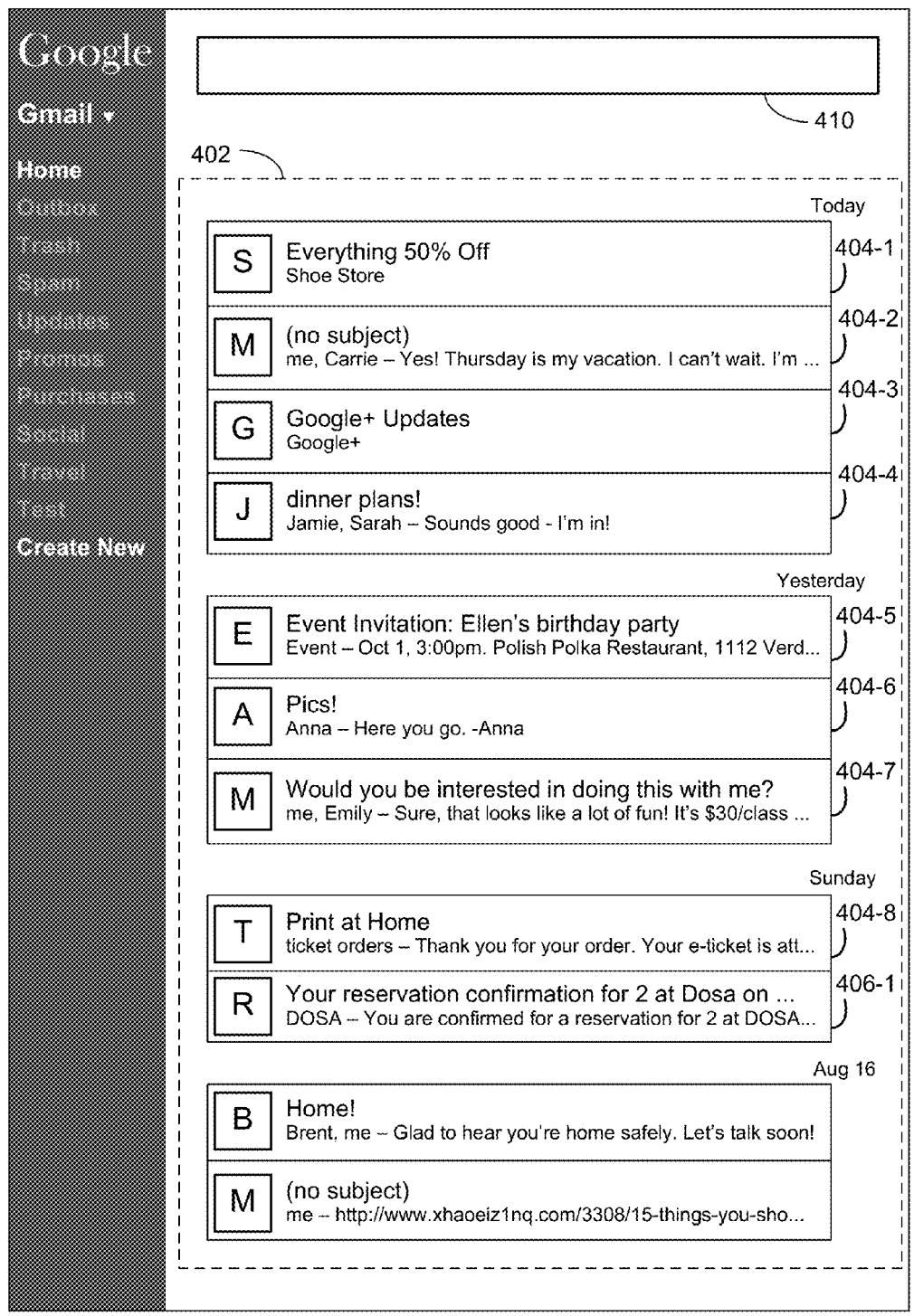
FIGS. 4A-4H are depictions of example user interfaces of a messaging application for displaying electronic messages in accordance with some embodiments.

An example user interface 400 for a messaging application is shown in FIG. 4A. In some embodiments, the example user interface 400 includes an electronic message list 402. In some embodiments, the electronic message list 402 is displayed in an electronic message list panel (e.g., the portion of user interface 400 with a white background in FIG. 4A). The electronic message list 402 comprises a plurality of user interface objects. Some of these user interface objects represent separate electronic messages, such as user interface object 404-1 and 406-1, etc. In some embodiments, a respective user interface object in the plurality of user interface objects is visually distinct in the electronic message list and represents one or more corresponding electronic messages in a plurality of electronic messages. For example, a user interface object 404-1 represents an electronic message from a shoe store. In another example, the user interface object 404-2 corresponds to a group (also called herein a cluster) of electronic messages (e.g., emails) having a collective association. In this case, the group of emails corresponding to the user interface object 404-2 includes electronic messages exchanged between a user (e.g., "me") and another user named Carrie. In yet another example, the user interface object 404-4 corresponds to a group of electronic messages that have the same subject "dinner plans!" Similarly, the user interface object 404-7 corresponds to groups of electronic messages having a collective association. For example, the user interface object 404-7 corresponds to an email conversation thread including at least two email messages having a collective association (e.g., based on subject of the email, recipients and senders or an identification number). In another example, a user interface object 404-6 corresponds to a single email message from a user named Anna.

In some embodiments, a user interface object is displayed with all the text of one electronic message associated with the user interface object. For example, the body text of the single email message in the user interface object 404-6 is fairly short, and the user interface object 404-6 includes the entire body text of the single email. In some embodiments, a user interface object is displayed with a subset of the text of the electronic message associated with the user interface object. For example, the user interface object 404-5 includes a subset of the body text of a corresponding email. In some embodiments, a user interface object is associated with a plurality of electronic messages and the user interface object includes a subset of the body text of the most recent electronic message (e.g., a most recently received electronic message) in the plurality of electronic messages associated with the respective user interface object. For example, the user interface object 404-2 includes more than one email message. The user interface object 404-4 is displayed with a subset of the text of the most recent email message in the plurality of emails associated with the user interface object 404-4 (e.g., "Sounds good—I'm in!").

FIG. 4A also illustrates that the example user interface 400 includes a user interface object 410 (e.g., a text field) for receiving a search query for electronic messages.

Figure 4B:
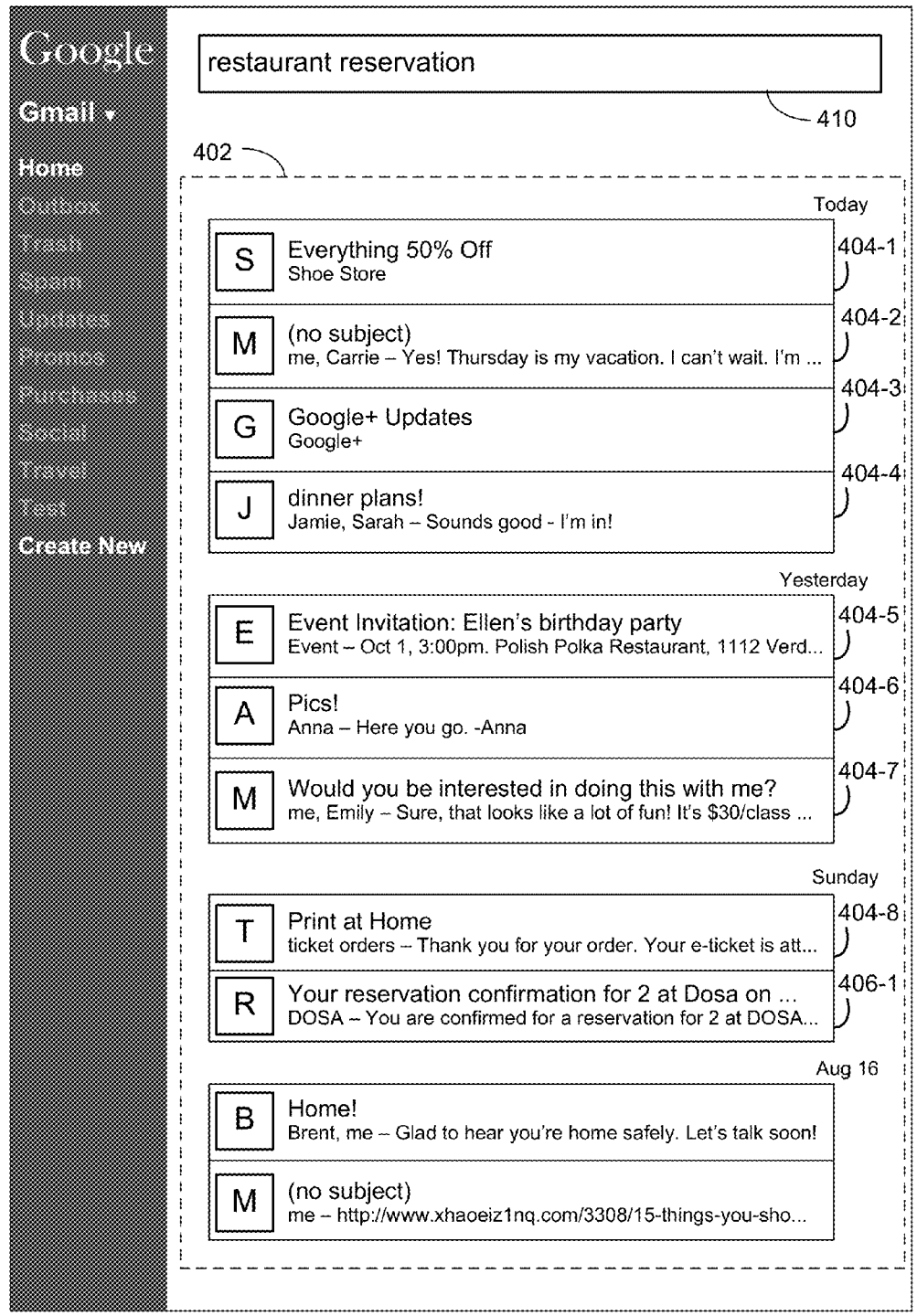
Figure 4C:
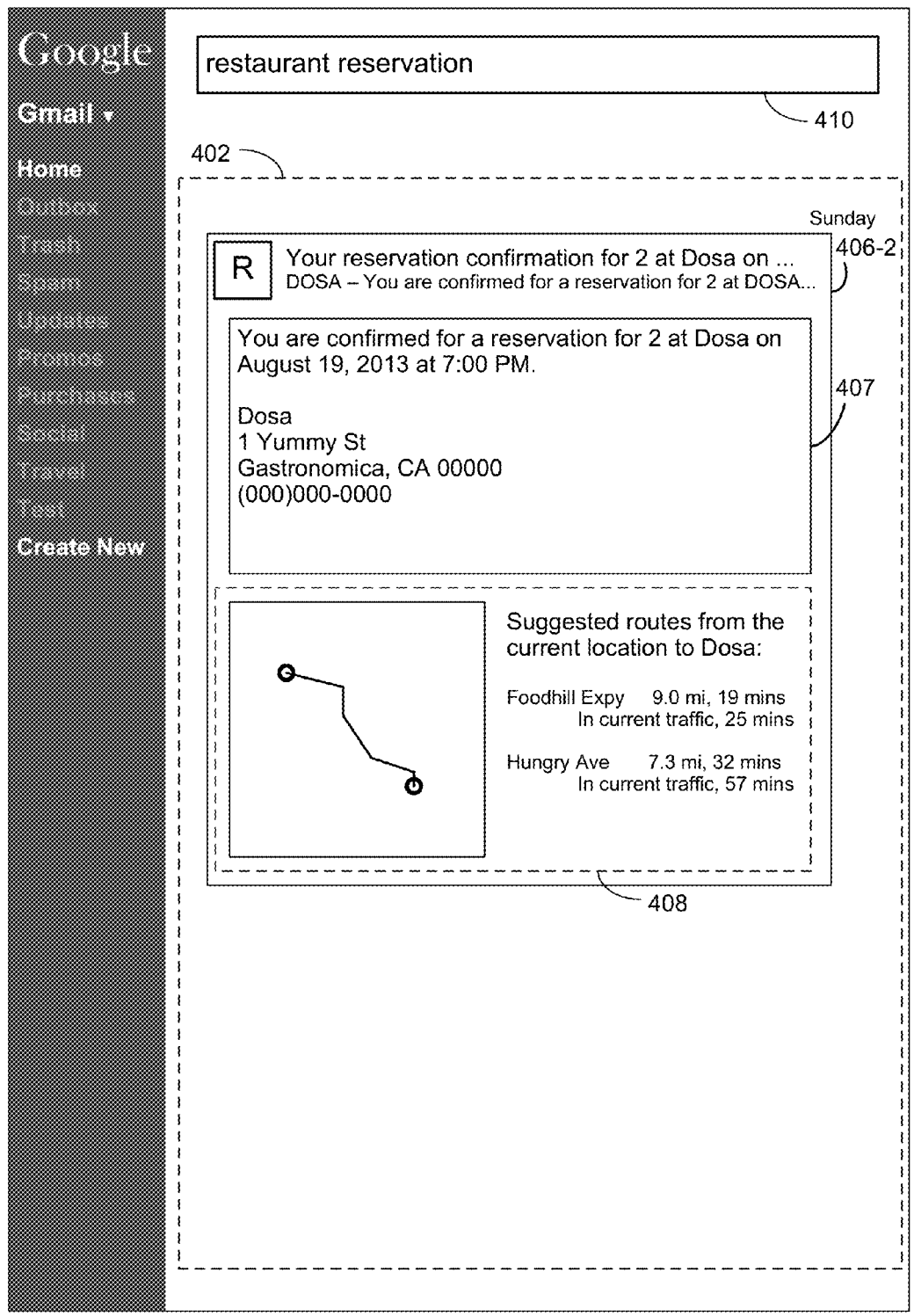

FIGS. 4B-4C illustrate receiving an example search query and updating the user interface. The example user interface illustrated in FIG. 4B is similar to the example user interface illustrated in FIG. 4A. FIG. 4B illustrates that a search query "restaurant reservation" is received (e.g., typed) in the user interface object 410.

FIG. 4C illustrates that, in response to receiving the search query, the electronic message list 402 is updated. In FIG. 4C, the electronic message list 402 includes one or more user interface objects that correspond to one or more electronic messages that satisfy the search query. In some embodiments, as shown in FIG. 4C, electronic messages that do not satisfy the search query are omitted from the electronic message list 402. For example, FIG. 4C shows that, in response to the search query "restaurant reservation," the user interface object 406-2 (originally displayed as electronic message 406-1 in FIG. 4A) is displayed and other previously displayed user interface objects (e.g., 404-1 through 404-8) cease to be displayed. FIG. 4C also illustrates that the user interface object 406-2 includes the body text 407 of a corresponding electronic message (e.g., "You are confirmed for a reservation for 2 at Dosa on Aug. 19, 2013 at 7:00 PM." with a corresponding address of the restaurant). The user interface object 406-2 also now includes additional information 408, such as a map of the restaurant or directions from a current location of the computing device to the restaurant, and estimated travel time from the current location of the computing device to the restaurant. The additional information is not included in the corresponding electronic message that was received by the user.

Figure 4D:
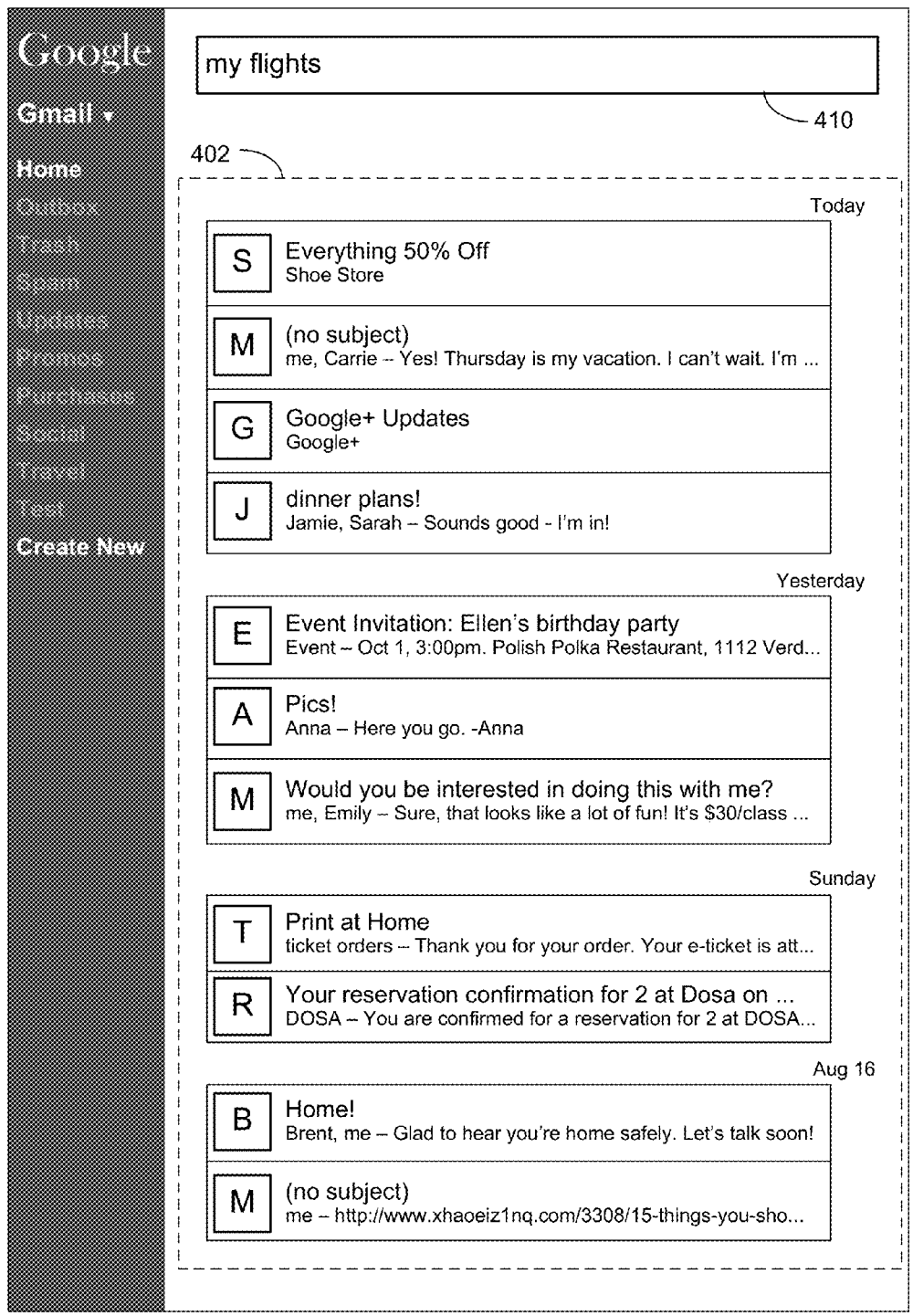
Figure 4E:
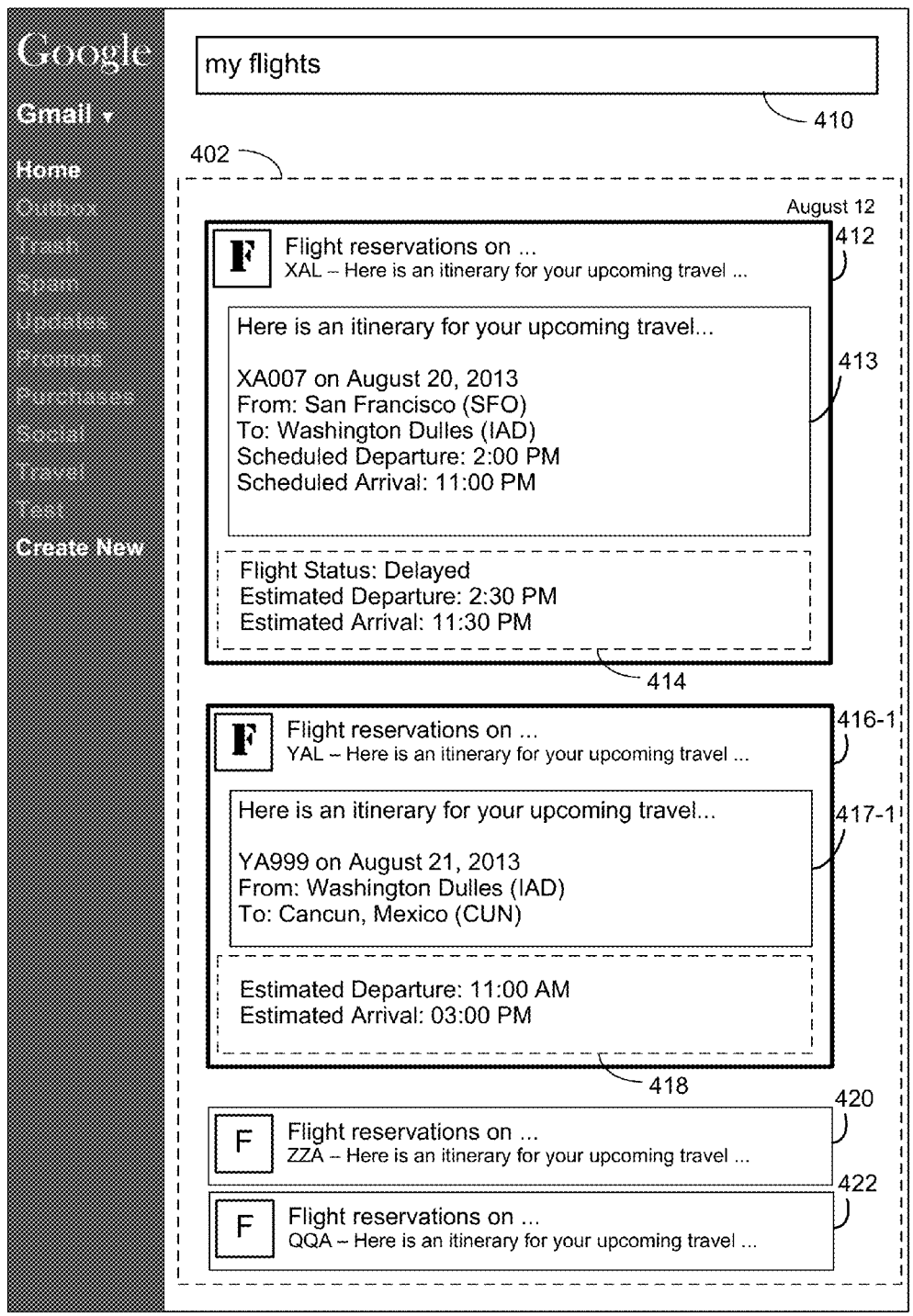
Figure 4F:
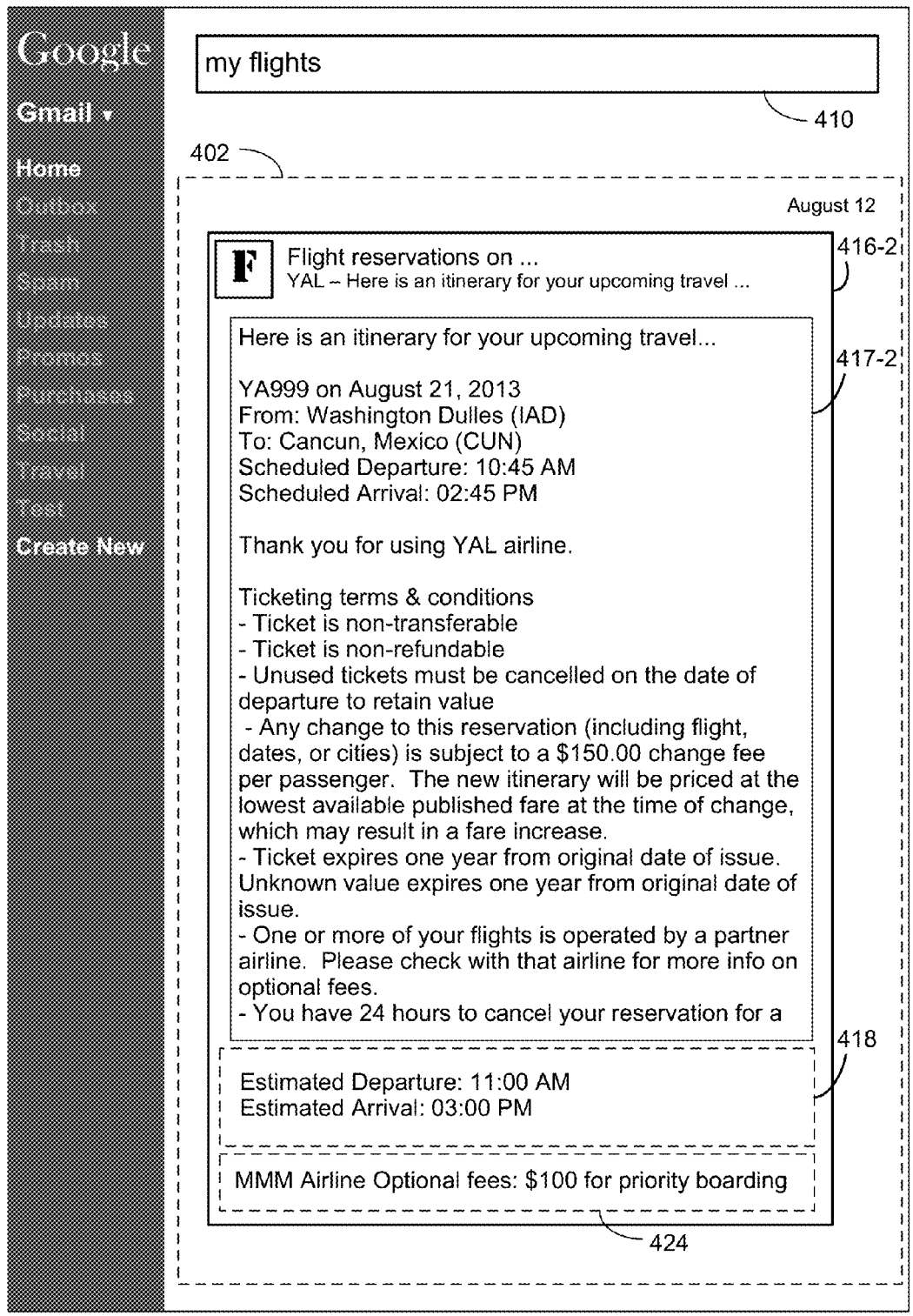

FIGS. 4D-4F illustrate receiving another example search query and updating the user interface in accordance with some embodiments The example user interface illustrated in FIG. 4D is similar to the example user interface illustrated in FIG. 4A. FIG. 4D illustrates that a search query "my flights" is received (e.g., typed) in the user interface object 410.

FIG. 4E illustrates that, in response to receiving the search query of FIG. 4D, the electronic message list 402 is updated. In FIG. 4E, the electronic message list 402 includes user interface objects, each of which corresponds to an electronic message that satisfies the search query. In some embodiments, as shown in FIG. 4E, electronic messages that do not satisfy the search query are omitted from the electronic message list 402. For example, FIG. 4E shows that, in response to the search query "my flights," the user interface objects 412 and 416-1 are displayed and other previously displayed user interface objects (e.g., 404-1 through 404-8 and 406-1) cease to be displayed. FIG. 4E also illustrates that the user interface object 412 includes at least a portion 413 of the body text of a corresponding electronic message, and the user interface object 416-1 includes a portion 417 of the body text of a corresponding electronic message. The user interface object 412 includes additional information 414, such as a flight status, estimated departure time, and estimated arrival time. The user interface object 416-1 also includes additional information 418, such as estimated departure time and estimated arrival time. This additional information was not part of the original electronic message received by the user.

FIG. 4E also illustrates that, in some embodiments, the electronic message list 402 includes user interface objects, each of which corresponds to an electronic message that satisfies the search query and does not have additional information that is not included in the corresponding electronic message. For example, user interface objects 420 and 422 correspond to electronic messages that do not include additional information. In some embodiments, a user interface object that does not include additional information is displayed without a body text of a corresponding electronic message. For example, the user interface object 420 does not include at least a portion of the body text of a corresponding electronic message. In some other embodiments, a user interface object that does not include additional information is displayed with a body text of a corresponding electronic message.

In some embodiments, display of the electronic message list 402 includes concurrent display of all electronic messages that satisfy the search query. In some embodiments, display of the electronic message list 402 includes display of a subset of electronic messages that satisfy the search query. For example, in some embodiments, when display of all of the electronic messages that satisfy the search query exceeds a display size of a user interface, only a subset of the electronic messages that satisfy the search query is displayed. For example, as shown in FIG. 4E, the displayed user interface objects (e.g., user interface objects 412, 416-1, 420, and 422) represent a subset of the electronic messages that satisfy the search query.

In some embodiments, a user may select one of the displayed user interface objects (e.g., the user interface objects 412, 416-1, 420, and 422). For example, the user may select one of the displayed user interface objects with a user input (e.g., a touch input, a mouse click, etc.) on the example user interface 400. In some embodiments, the user interface object 416-1 is selected on the basis of a user input received at a location that corresponds to the user interface object 416-1.

FIG. 4F illustrates that, in response to selection of the user interface object 416-1 (FIG. 4E), the electronic message list 402 is updated. In FIG. 4F, the display of the user interface object 416-1 (FIG. 4E) is replaced with display of a user interface object 416-2, and other user interface objects (e.g., user interface objects 412, 420, and 422) cease to be displayed.

FIG. 4F also illustrates that, in some embodiments, the user interface object 416-2 includes at least a portion 417-2 of the body text of a corresponding electronic message. In some embodiments, the portion 417-2 of the body text shown in FIG. 4F includes more of the body text of the corresponding electronic message than the portion 417-1 of the body text of the corresponding electronic message. In some embodiments, as shown in FIG. 4F, the user interface object 416-2 also includes additional information 424 (e.g., optional fees information) that is not included in the additional information 418.

Figure 4G:
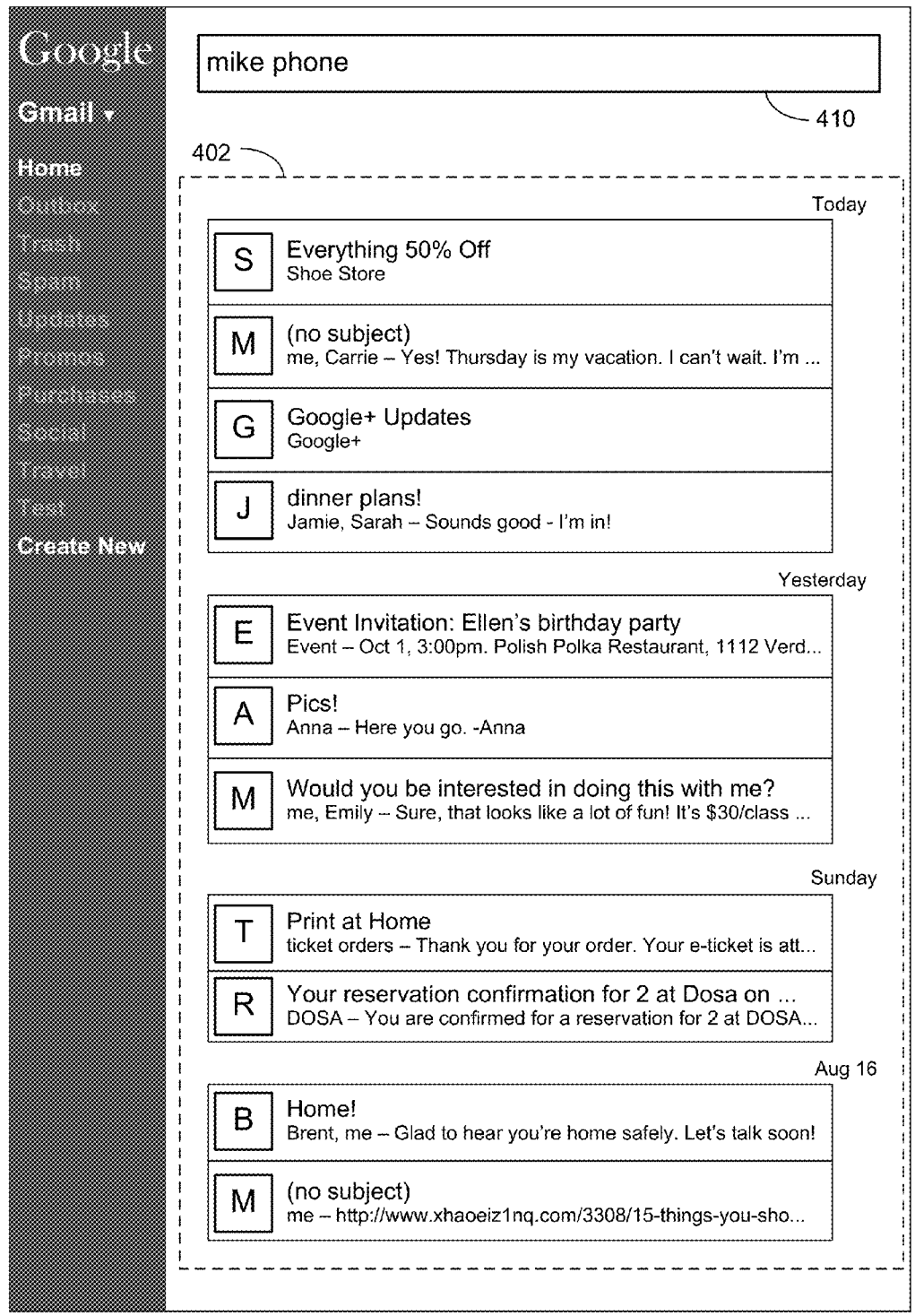
Figure 4H:
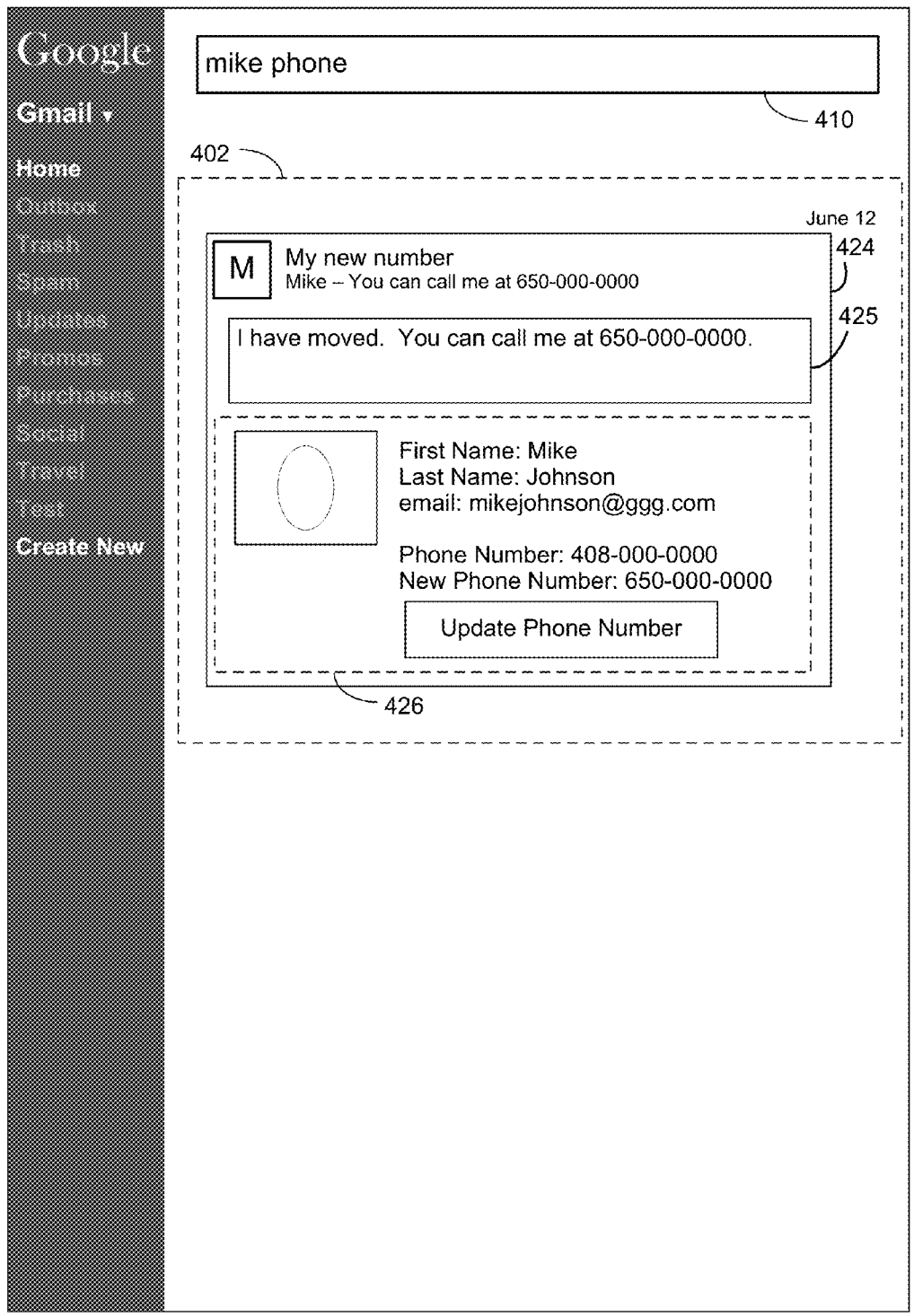

FIGS. 4G-4H illustrate receiving yet another example search query and updating the user interface in accordance with some embodiments. The example user interface illustrated in FIG. 4G is similar to the example user interface illustrated in FIG. 4A. FIG. 4G illustrates that a search query "mike phone" is received (e.g., typed) in the user interface object 410.

FIG. 4H illustrates that, in response to receiving the search query, the electronic message list 402 is updated. In FIG. 4H, the electronic message list 402 includes a user interface object that corresponds to an electronic message satisfying the search query (e.g., an electronic message that includes Mike's contact information). In some embodiments, as shown in FIG. 4H, electronic messages that do not satisfy the search query are omitted from the electronic message list 402. For example, FIG. 4H shows that, in response to the search query "mike phone," the user interface object 424 is displayed and other previously displayed user interface objects (e.g., 404-1 through 404-8 and 406-1) cease to be displayed. FIG. 4H also illustrates that the user interface object 424 includes at least a portion 425 of the body text of a corresponding electronic message. The user interface object 424 includes additional information 426, such as the sender's last name and previous phone number, which are not included in the corresponding electronic message. In some embodiments, as illustrated in FIG. 4H, the additional information 426 includes a user interface object (e.g., "update phone number"), which, when selected, initiates updating contact information stored in the contact information database (e.g., contact information 224, FIG. 2) with information included in the corresponding electronic message.

Figure 5A:
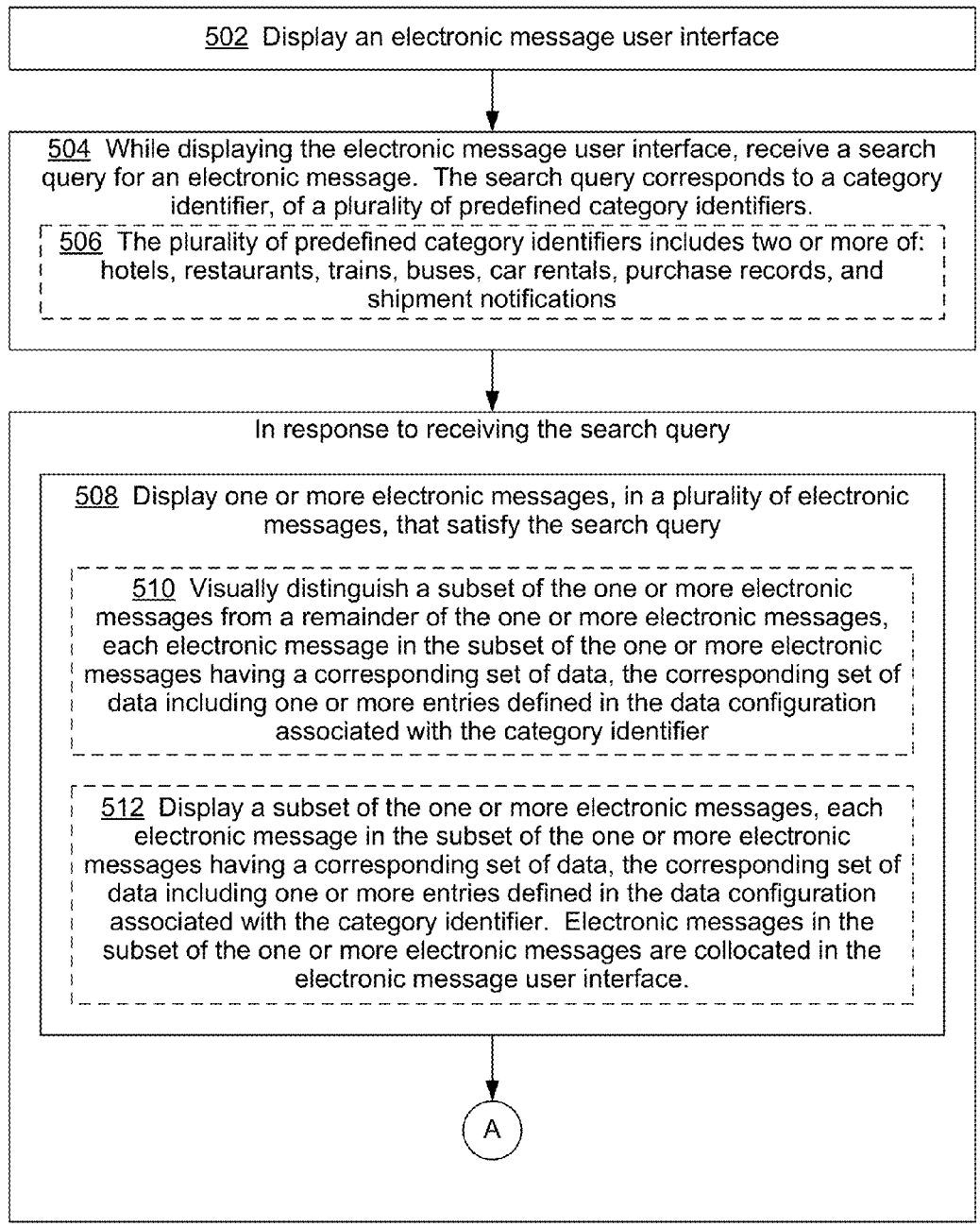
FIGS. 5A-5B are example flow charts illustrating methods for displaying electronic messages, in accordance with some embodiments.
Figure 5B:
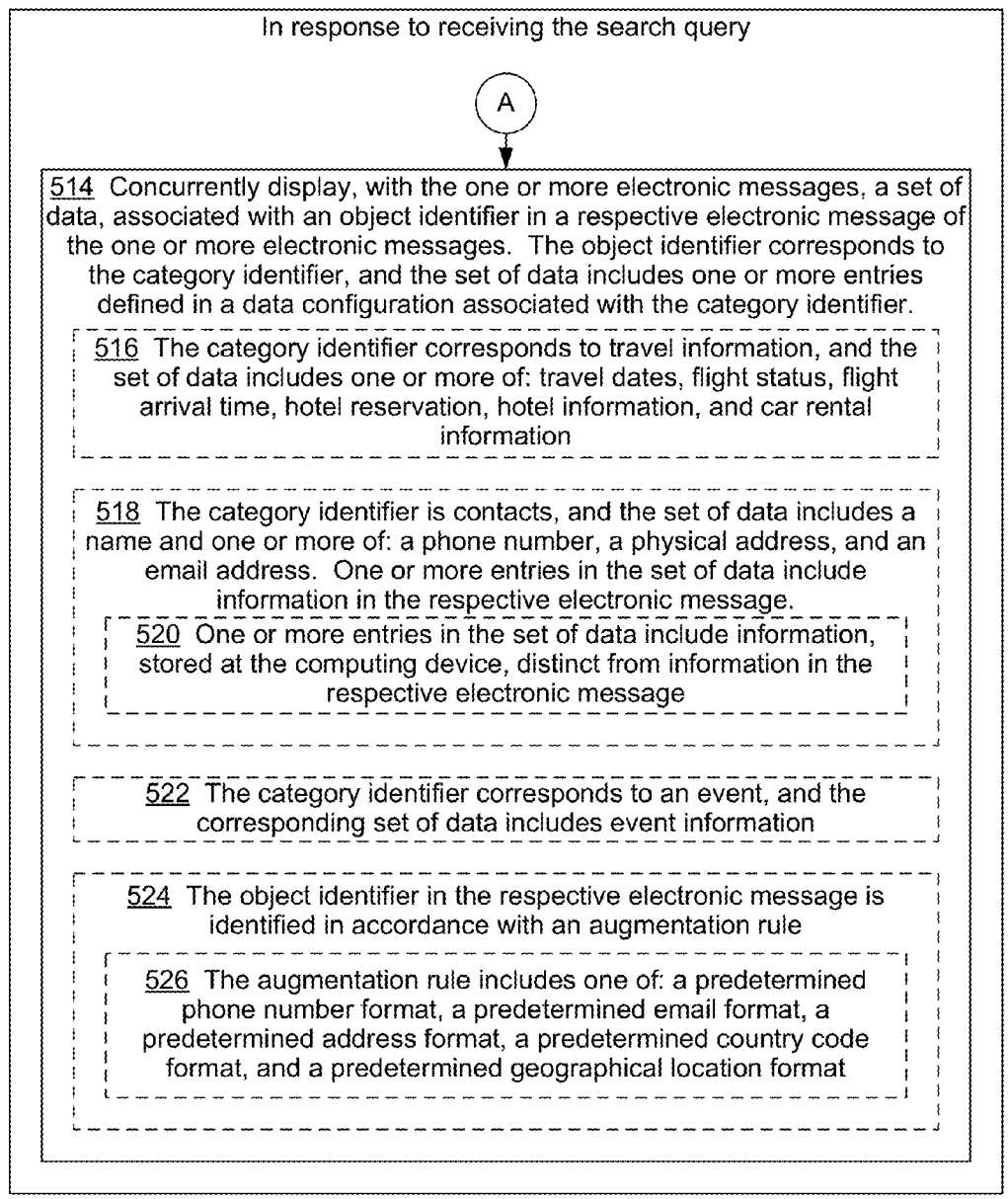
Figure 6:
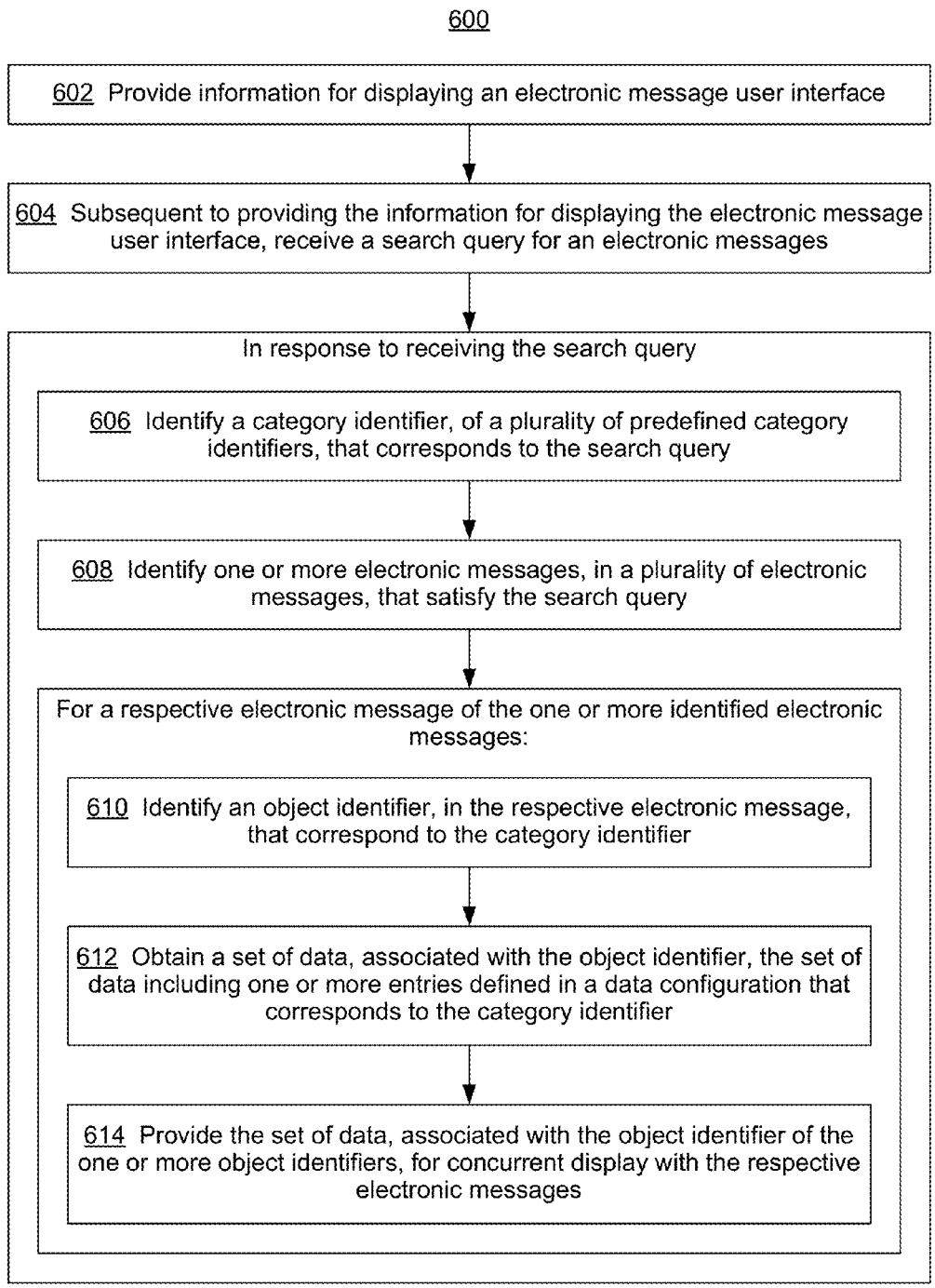
FIG. 6 is an example flow chart illustrating methods for processing a search query, in accordance with some embodiments.

FIGS. 4A-4H are used to describe operations illustrated in FIGS. 5A-5B and 6.

FIGS. 5A and 5B are example flow charts illustrating a method 500 for displaying electronic messages, in accordance with some embodiments. In some embodiments, the method 500 is performed at a computing device (e.g., device 102, FIG. 2) having one or more processors and memory storing one or more programs for execution by the one or more processors. In some embodiments, the computing device includes a display. In some embodiments, the computing device is coupled with a display, but does not include the display as part of the computing device.

The method includes (502) displaying an electronic message user interface (e.g., the user interface 400, FIG. 4A).

The method includes (504), while displaying the electronic message user interface, receiving a search query. For example, as shown in FIG. 4B, a search query is received while the user interface 400 is displayed. The search query corresponds to a category identifier of a plurality of predefined category identifiers (e.g., the category identifiers 316, FIG. 3).

In some embodiments, the plurality of predefined category identifiers includes (506) two or more of: hotels, restaurants, trains, buses, car rentals, purchase records, and shipment notifications. In some embodiments, the plurality of predefined category identifiers also includes one or more of: flights and meetings.

In some embodiments, the category identifier corresponding to a search query is identified from the search query itself. In some embodiments, the category identifier corresponding to a search query is specified by the user. For example, in some embodiments, the electronic message interface includes a prompt for the search query and a menu of possible category identifiers.

The method includes, in response to receiving the search query, (508) displaying one or more electronic messages, in a plurality of electronic messages, that satisfy the search query. For example, as shown in FIG. 4C, an electronic message that satisfies the search query is displayed in the user interface object 406-2. In some embodiments, an electronic message that satisfies a search query includes all of the keywords in the search query. In some embodiments, an electronic message that satisfies a search query includes one or more keywords that correspond to a category identified by the search query without including all of the keywords in the search query. In some embodiments, an electronic message that satisfies a search query includes one or more keywords that correspond to a category identified by the search query without including any keyword in the search query.

In some embodiments, the method includes (510) visually distinguishing a subset of the one or more electronic messages from a remainder of the one or more electronic messages, where each electronic message in the subset of the one or more electronic messages has a corresponding set of data, and the corresponding set of data includes one or more entries defined in a data configuration associated with the category identifier. For example, as shown in FIG. 4E, electronic messages that have corresponding sets of additional data (e.g., as represented by the user interface objects 412 and 416-1) are visually distinguished from the remainder of the electronic messages that satisfy the search query. In some embodiments, electronic messages that have corresponding sets of additional data are displayed with different colors, highlights, line thicknesses, fonts, and/or font sizes. In some embodiments, each electronic message in the remainder of the one or more electronic messages does not have a corresponding set of data. In some embodiments, the remainder of the one or more electronic messages does not include any electronic message in the subset of the one or more electronic messages.

In some embodiments, the method includes (512) displaying a subset of the one or more electronic messages, where each electronic message in the subset of the one or more electronic messages has a corresponding set of data, and the corresponding set of data includes one or more entries defined in the data configuration associated with the category identifier. Electronic messages in the subset of the one or more electronic messages are collocated in the electronic message user interface. For example, as shown in FIG. 4E, electronic messages that have corresponding sets of additional data (e.g., as represented by the user interface objects 412 and 416-1) are collocated. In some embodiments, collocating electronic messages in the subset of the one or more electronic messages includes displaying the electronic messages of the subset of the one or more electronic messages without any electronic message of the remainder of the one or more electronic messages between any two electronic messages of the subset of the one or more electronic messages. In some other embodiments, electronic messages of the subset of the one or more electronic messages are interspersed with electronic messages of the remainder of the one or more electronic messages.

The method includes (514) concurrently displaying, with the one or more electronic messages, a set of data, associated with an object identifier in a respective electronic message of the one or more electronic messages. The object identifier corresponds to the category identifier. The set of data includes one or more entries defined in a data configuration associated with the category identifier. For example, in some embodiments, the search query "restaurant reservation" as shown in FIG. 4C is determined to correspond to a category identifier "restaurants." In addition, in some embodiments, as shown in FIG. 4C, the electronic message 406-2 is identified as satisfying the search query, and a restaurant name "Dosa" in the electronic message 406-2 is identified as an object identifier (e.g., a restaurant name) for the "restaurants" category identifier. In some embodiments, a data configuration associated with the "restaurants" category identifier defines that directions from a current location to a restaurant and traffic conditions are to be concurrently displayed with a corresponding electronic message (e.g., the electronic message 406-2). In some embodiments, as shown in FIG. 4C, directions from a current location to the Dosa restaurant and traffic conditions are concurrently displayed with a body text 407 of the electronic message 406-2.

In some embodiments, the category identifier corresponds (516) to travel information, and the set of data includes one or more of: travel dates, flight status, flight arrival time, hotel reservation, hotel information, and car rental information. In some embodiments, the plurality of predefined category identifiers includes travel information, and a data configuration associated with the "travel information" category identifier defines that one or more of: travel dates, flight status, flight arrival time, hotel reservation, hotel information, and car rental information are to be concurrently displayed with the respective electronic message.

In some embodiments, the category identifier is (518) contacts, and the set of data includes a name and one or more of: a phone number, a physical address, and an email address; wherein one or more entries in the set of data include information in the respective electronic message. In some embodiments, the plurality of predefined category identifiers includes contacts. In some embodiments, a data configuration associated with the "contacts" category identifier defines that a name and one or more of: a phone number, a physical address, and an email address are to be concurrently displayed with the respective electronic message. For example, as shown in FIG. 4H, additional information 426 including the name, email address, and phone number of a contact person is concurrently displayed with the body text 425 of the respective electronic message 424.

In some embodiments, the one or more entries in the set of data include (520) information, stored at the computing device, distinct from information in the respective electronic message. In some embodiments, the one or more entries in the set of data include information not included in the respective electronic message. For example, as shown in FIG. 4H, the additional information 426 includes a previous phone number "408-000-0000," which is stored in a computing device (e.g., the device 102, FIG. 2) and distinct from the information in the respective electronic message (e.g., the new phone number 650-000-0000). In some embodiments, the computing device uses the analysis module 110 (FIG. 2) to access information (e.g., contact information 224, FIG. 2) stored at the computing device.

In some embodiments, the category identifier corresponds (522) to an event, and the corresponding set of data includes event information. In some embodiments, the plurality of predefined category identifiers includes an event. In some embodiments, a data configuration that corresponds to the "event" category identifier defines that event information (e.g., date, time, location, and/or invitees) be concurrently displayed with the respective electronic message.

In some embodiments, the respective electronic message is identified in accordance with an augmentation rule. For example, as shown in FIG. 4H, in response to the search query "mike phone," the electronic message 424 is identified even though the electronic message 424 does not include the term "phone." In some embodiments, the electronic message 424 is tagged with a keyword "phone" prior to receiving the search query in accordance with a determination that the electronic message 424 includes information that corresponds to a predefined phone number format (e.g., "###-###-####" where each # symbol denotes a single digit number). Thus, in some embodiments, one or more electronic messages that satisfy a search query include one or more electronic messages tagged with a keyword in the search query. The augmentation rule is described further in U.S. Provisional patent application Ser. No. 14/143,594, filed Dec. 30, 2013, entitled "Systems and Method for Clustering Electronic Messages", which is incorporated by reference herein in its entirety.

In some embodiments, the object identifier in the respective electronic message is identified (524) in accordance with an augmentation rule. For example, in some embodiments, as shown in FIG. 4H, in response to the search query "mike phone," a phone number in the body text 425 of the electronic message 424 is identified using an augmentation rule (e.g., using a predefined phone number format) regardless of whether the electronic message 424 includes the term "phone."

In some embodiments, the augmentation rule includes (526) one of: a predetermined phone number format (e.g., "###-###-####," "###.###.####," "(###) ###-####," etc.), a predetermined email format, a predetermined address format, a predetermined country code format, and a predetermined geographical location format.

In some embodiments, the method includes (528) displaying a portion of a first electronic message in a subset of the one or more electronic messages, while foregoing displaying one or more messages, in the subset of the one or more electronic messages, other than the first electronic message, where each electronic message in the subset of the one or more electronic messages has a corresponding set of data, and the corresponding set of data includes one or more entries defined in the data configuration associated with the category identifier. For example, in some embodiments, one electronic message (e.g., 416-1, FIG. 4E) of the electronic messages that have corresponding sets of data is selected and the selected electronic message is displayed without display of other electronic messages that have corresponding sets of data (as shown in FIG. 4F). In another example, in some embodiments, as shown in FIG. 4H, only one electronic message that has a corresponding set of data is displayed regardless of a number of electronic messages that have corresponding sets of data.

In some embodiments, the method includes (530) updating the display of the set of data independent of a user input, and repeating the updating of the display of the set of data independent of user inputs. For example, in some embodiments, a computing device (e.g., the device 102, FIG. 2) changes its location while displaying the additional information 408 (e.g., directions) on the example user interface 400 (e.g., a user of the computing device travels in a car while carrying the computing device), the computing device updates the additional information 408, such as directions, without a user input.

FIG. 6 is an example flow chart illustrating a method 600 for processing a search query, in accordance with some embodiments. In some embodiments, the method 600 is performed at a server system (e.g., server system 106, FIG. 3) having one or more processors and memory storing one or more programs for execution by the one or more processors.

The method includes (602) providing information for displaying an electronic message user interface. In some embodiments, the server system uses the network interface 304, the transfer module 328, and the network communication module 312 (FIG. 3) to provide information for displaying an electronic message user interface (e.g., the example user interface 400, FIG. 4A) to a computing device (e.g., the device 102, FIG. 2).

The method includes, subsequent to providing the information for displaying the electronic message user interface, (604) receiving a search query for an electronic message. In some embodiments, the server system receives the search query for an electronic message from a computing device (e.g., the device 102, FIG. 2) using the network interface 304, the network communication module 312, and the message module 320 (FIG. 3).

The method includes, in response to receiving the search query, (606) identifying a category identifier, of a plurality of predefined category identifiers, that corresponds to the search query. In some embodiments, the server system identifies a category identifier that corresponds to the search query using the category module 314 and the plurality of predefined category identifiers 316 (FIG. 3).

The method includes (608) identifying one or more electronic messages, in a plurality of electronic messages, that satisfy the search query. In some embodiments, the server system identifies one or more electronic messages, in a plurality of electronic messages, that satisfy the search query using the message module 320 or the query processing module 322 of the message module 320 (FIG. 3).

The method includes, for a respective electronic message of the one or more identified electronic messages, (610) identifying an object identifier, in the respective electronic message, that corresponds to the category identifier. In some embodiments, for a respective electronic message of the one or more identified electronic messages, the server system identifies an object identifier, in the respective electronic message, that corresponds to the category identifier using the object identifier module 324 (FIG. 3).

The method includes (612) obtaining a set of data, associated with the object identifier, and the set of data includes one or more entries defined in a data configuration that corresponds to the category identifier. In some embodiments, the server system obtains a set of data, associated with the object identifier, using the data access module 326 (FIG. 3), and the set of data includes one or more entries defined in a data configuration (e.g., data configurations 318) that corresponds to the category identifier.

The method includes (614) providing the set of data, associated with the object identifier of the one or more object identifiers, for concurrent display with the respective electronic messages. In some embodiments, the server system provides the set of data, associated with the object identifier of the one or more object identifiers, for concurrent display with the respective electronic messages using the transfer module 328 (FIG. 3).

Some of the characteristics described above with respect to the method 500 are applicable to the method 600. For example, in some embodiments of the method 600, the plurality of predefined category identifiers includes two or more of: hotels, restaurants, trains, buses, car rentals, purchase records, and shipment notifications. In another example, in some embodiments, the category identifier is contacts, and the set of data includes a name and one or more of: a phone number, a physical address, and an email address. One or more entries in the set of data include information in the respective electronic message, and one or more entries in the set of data include information distinct from information in the respective electronic message. For brevity, these details are not repeated herein.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

It will also be understood that, although the terms "first," "second," etc. may be used herein to describe various elements, these elements should not be limited by these terms. These terms are only used to distinguish one element from another. For example, a first electronic message could be termed a second electronic message, and, similarly, a second electronic message could be termed a first electronic message, without changing the meaning of the description, so long as all occurrences of the "first electronic message" are renamed consistently and all occurrences of the "second electronic message" are renamed consistently. The first electronic message and the second electronic message are both electronic messages, but they are not the same electronic message.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details were set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method for displaying electronic messages, comprising:
   at a computing device having one or more processors and memory storing one or more programs for execution by the one or more processors:

displaying at least a first subset of a plurality of messages in an electronic message user interface associated with a user, wherein each message in the plurality of messages is addressed at least to the user;

while displaying the electronic message user interface, receiving a search query, wherein the search query corresponds to a category identifier, of a plurality of predefined category identifiers; and, in response to receiving the search query:

using the search query to identify a second subset of messages in the plurality of messages that satisfy the search query, wherein a respective message in the plurality of messages satisfies the search query and is included in the second subset of messages when content of the respective message includes one or more key words associated with the category identifier corresponding to the search query;

displaying the second subset of messages; and concurrently displaying, with the second subset messages, a set of data, associated with an object identifier in a respective electronic message of the second subset of messages, wherein the object identifier corresponds to the category identifier, and the set of data includes a plurality of entries defined in a data configuration associated with the category identifier, wherein displayed information for a first entry in the plurality of entries for a respective message in the second subset of messages is obtained from a source external to the respective message and displayed information for a second entry in the plurality of entries is obtained from the respective message.

2. The method of claim 1, further comprising:
visually distinguishing one or more electronic messages in the second subset of messages from a remainder of the second subset of electronic messages, each respective electronic message in the one or more electronic messages being associated with the object identifier and being displayed with a corresponding set of data that includes one or more entries defined in the data configuration associated with the category identifier.

3. The method of claim 1, further comprising:
displaying one or more electronic messages of the second subset of messages, each respective electronic message in the one or more electronic messages associated with the object identifier and being displayed with a corresponding set of data that includes one or more entries defined in the data configuration associated with the category identifier, wherein the one or more electronic messages are collocated in the electronic message user interface.

4. The method of claim 1, further comprising:
displaying a portion of a first electronic message in the second subset of electronic messages, each respective electronic message in the second subset of electronic messages having a corresponding set of data that includes one or more entries defined in the data configuration associated with the category identifier, while foregoing displaying one or more messages, in the second subset of electronic messages, other than the first electronic message.

5. The method of claim 1, wherein the plurality of predefined category identifiers includes two or more of: hotels, restaurants, trains, buses, car rentals, purchase records, and shipment notifications.

6. The method of claim 1, wherein the category identifier corresponds to travel information, and the set of data includes one or more of: travel dates, flight status, flight arrival time, hotel reservation, hotel information, and car rental information.

7. The method of claim 1, wherein the category identifier is contacts, and the set of data includes a name and one or more of: a phone number, a physical address, and an email address.

8. The method of claim 1, wherein the category identifier corresponds to an event, and the corresponding set of data includes event information.

9. The method of claim 1, further comprising:
updating the display of the set of data independent of a user input; and
repeating the updating of the display of the set of data independent of user input.

10. The method of claim 1, wherein the object identifier in the respective electronic message is identified in accordance with an augmentation rule.

11. The method of claim 10, wherein the augmentation rule includes one of: a predetermined phone number format, a predetermined email format, a predetermined address format, a predetermined country code format, and a predetermined geographical location format.

12. The method of claim 1, wherein the category identifier, of the plurality of category identifiers, for the search query is determined from parsing the search query.

13. A method for processing message queries, comprising:
at a server system having one or more processors and memory storing one or more programs for execution by the one or more processors:
providing information for displaying at least a first subset of a plurality of messages in an electronic message user interface associated with a user, wherein each message in the plurality of messages is addressed at least to the user;
subsequent to providing the information for displaying the electronic message user interface, receiving a search query; and,
in response to receiving the search query:
identifying a category identifier, of a plurality of predefined category identifiers, that corresponds to the search query;
using the search query to identify a second subset of messages in the plurality of messages that satisfy the search query, wherein a respective message in the plurality of messages satisfies the search query and is included in the second subset of messages when content of the respective message includes one or more key words associated with the category identifier corresponding to the search query;
for a respective electronic message of the second subset of messages:
identifying an object identifier, in the respective electronic message, that corresponds to the category identifier;
obtaining a set of data, associated with the object identifier, the set of data including a plurality of entries defined in a data configuration that corresponds to the category identifier, wherein information for a first entry in the plurality of entries for a respective message in the second subset of messages is obtained from a source external to the respective message and information for a second entry in the plurality of entries is obtained from the respective message; and providing the set of data, associated with the object identifier of the one or more object identifiers, for concurrent display with the second subset of electronic messages.

14. The method of claim 13, wherein the plurality of predefined category identifiers includes two or more of: hotels, restaurants, trains, buses, car rentals, purchase records, and shipment notifications.

15. The method of claim 13, wherein:
the category identifier is contacts, and the set of data includes a name and one or more of: a phone number, a physical address, and an email address.

16. A computing device for displaying electronic messages, comprising:
one or more processors;
memory; and
one or more programs, wherein the one or more programs are stored in the memory and are configured to be executed by the one or more processors, the one or more programs including instructions for:
displaying at least a first subset of a plurality of messages in an electronic message user interface associated with a user, wherein each message in the plurality of messages is addressed at least to the user;
while displaying the electronic message user interface, receiving a search query, wherein the search query corresponds to a category identifier, of a plurality of predefined category identifiers; and,
in response to receiving the search query:
using the search query to identify a second subset of messages in the plurality of messages that satisfy the search query, wherein a respective message in the plurality of messages satisfies the search query and is included in the second subset of messages when content of the respective message includes one or more key words associated with the category identifier corresponding to the search query;
displaying the second subset of messages; and
concurrently displaying, with the second subset messages, a set of data, associated with an object identifier in a respective electronic message of the second subset of messages, wherein the object identifier corresponds to the category identifier, and the set of data includes a plurality of entries defined in a data configuration associated with the category identifier, wherein displayed information for a first entry in the plurality of entries for a respective message in the second subset of messages is obtained from a source external to the respective message and displayed information for a second entry in the plurality of entries is obtained from the respective message.

17. The computing device of claim 16, wherein the one or more programs further include instructions for:
displaying one or more electronic messages of the second subset of messages, each respective electronic message in the one or more electronic messages being associated with the object identifier and having a corresponding set of data that includes one or more entries defined in the data configuration associated with the category identifier, wherein the one or more electronic messages are collocated in the electronic message user interface.

18. The computing device of claim 16, wherein the one or more programs further include instructions for:
displaying a portion of a first electronic message in the second subset of electronic messages, each respective electronic message in the second subset of electronic messages having a corresponding set of data that includes one or more entries defined in the data configuration associated with the category identifier, while foregoing displaying one or more messages, in the second subset of electronic messages, other than the first electronic message.

19. A server system for processing message queries, comprising:
one or more processors;
memory; and
one or more programs, wherein the one or more programs are stored in the memory and are configured to be executed by the one or more processors, the one or more programs including instructions for:
providing information for displaying at least a first subset of a plurality of messages in an electronic message user interface associated with a user, wherein each message in the plurality of messages is addressed at least to the user;
subsequent to providing the information for displaying the electronic message user interface, receiving a search query; and,
in response to receiving the search query:
identifying a category identifier, of a plurality of predefined category identifiers, that corresponds to the search query;
using the search query to identify a second subset of messages in the plurality of messages that satisfy the search query, wherein a respective message in the plurality of messages satisfies the search query and is included in the second subset of messages when content of the respective message includes one or more key words associated with the category identifier corresponding to the search query;
for a respective electronic message of the second subset of messages:
identifying an object identifier, in the respective electronic message, that corresponds to the category identifier;
obtaining a set of data, associated with the object identifier, the set of data including a plurality of entries defined in a data configuration that corresponds to the category identifier, wherein information for a first entry in the plurality of entries for a respective message in the second subset of messages is obtained from a source external to the respective message and information for a second entry in the plurality of entries is obtained from the respective message; and
providing the set of data, associated with the object identifier of the one or more object identifiers, for concurrent display with the second subset of electronic messages.

* * * * *